United States Patent
Wang et al.

(10) Patent No.: US 11,012,716 B2
(45) Date of Patent: May 18, 2021

(54) IMAGE FILE PROCESSING METHOD, SYSTEM AND STORAGE MEDIUM

(71) Applicant: TENCENT TECHNOLOGY (SHENZHEN) COMPANY LIMITED, Guangdong (CN)

(72) Inventors: Shitao Wang, Shenzhen (CN); Xiaoyu Liu, Shenzhen (CN); Jiajun Chen, Shenzhen (CN); Xiaozheng Huang, Shenzhen (CN); Piao Ding, Shenzhen (CN); Haijun Liu, Shenzhen (CN); Binji Luo, Shenzhen (CN); Xinxing Chen, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/374,314

(22) Filed: Apr. 3, 2019

(65) Prior Publication Data

US 2019/0230382 A1 Jul. 25, 2019

Related U.S. Application Data

(63) Continuation of application No. PCT/CN2018/080445, filed on Mar. 26, 2018.

(30) Foreign Application Priority Data

Apr. 8, 2017 (CN) .......................... 201710225909.0

(51) Int. Cl.
*H04N 19/70* (2014.01)
*H04N 19/46* (2014.01)
(Continued)

(52) U.S. Cl.
CPC .......... *H04N 19/70* (2014.11); *H04N 19/157* (2014.11); *H04N 19/172* (2014.11);
(Continued)

(58) Field of Classification Search
CPC .. H04N 19/157; H04N 19/172; H04N 19/186; H04N 19/46; H04N 19/70;
(Continued)

(56) References Cited

U.S. PATENT DOCUMENTS

| 5,793,427 A | 8/1998 | Mills et al. |
| 2003/0123725 A1* | 7/2003 | Narusawa ............. G06T 11/001 382/166 |

(Continued)

FOREIGN PATENT DOCUMENTS

| CN | 101540901 A | 9/2009 |
| CN | 101742317 A | 6/2010 |

(Continued)

OTHER PUBLICATIONS

Written Opinion in International Application No. PCT/CN2018/080445, dated Jun. 29, 2018.
(Continued)

*Primary Examiner* — Francis Geroleo
(74) *Attorney, Agent, or Firm* — Sughrue Mion, PLLC

(57) ABSTRACT

A picture file processing method, apparatus, and computer readable medium are provided. The method includes parsing a picture file, to obtain a picture header information data segment, first stream data, and second stream data of a first image thereof. The first stream data of the first image is decoded to generate red-green-blue (RGB) data of the first image. The second stream data of the first image is decoded to generate Alpha data of the first image. Red-green-blue-alpha (RGBA) data corresponding to the first image are generated according to the RGB data and the Alpha data.

20 Claims, 28 Drawing Sheets

(51) Int. Cl.
*H04N 19/157* (2014.01)
*H04N 19/172* (2014.01)
*H04N 19/186* (2014.01)
*H04N 21/4402* (2011.01)
*H04N 21/2343* (2011.01)

(52) U.S. Cl.
CPC .......... *H04N 19/186* (2014.11); *H04N 19/46* (2014.11); *H04N 21/234318* (2013.01); *H04N 21/234336* (2013.01); *H04N 21/440218* (2013.01); *H04N 21/440236* (2013.01)

(58) Field of Classification Search
CPC ... H04N 21/234318; H04N 21/234336; H04N 21/440218; H04N 21/440236
See application file for complete search history.

(56) References Cited

U.S. PATENT DOCUMENTS

| | | | |
|---|---|---|---|
| 2006/0103660 A1* | 5/2006 | Maynard | H04N 21/40 345/589 |
| 2006/0164437 A1 | 7/2006 | Kuno | |
| 2012/0275525 A1 | 11/2012 | Uro | |
| 2013/0089149 A1* | 4/2013 | Hayashi | H04N 19/51 375/240.16 |
| 2013/0328908 A1* | 12/2013 | Sundbom | G09G 5/06 345/592 |
| 2014/0126814 A1* | 5/2014 | Christensen | H04N 19/70 382/166 |
| 2014/0375882 A1* | 12/2014 | Gaiazov | H04N 5/272 348/453 |
| 2017/0085895 A1* | 3/2017 | Gu | H04N 19/46 |
| 2017/0180737 A1* | 6/2017 | Ye | H04N 19/159 |
| 2018/0277164 A1* | 9/2018 | Wang | H04N 19/46 |
| 2018/0352219 A1* | 12/2018 | Maze | H04N 19/176 |

FOREIGN PATENT DOCUMENTS

| | | |
|---|---|---|
| CN | 102036059 A | 4/2011 |
| CN | 102103463 A | 6/2011 |
| CN | 107071515 A | 8/2017 |

OTHER PUBLICATIONS

Communication dated Oct. 25, 2019, from the Intellectual Property Office of Taiwan in counterpart Application No. 107111917.
Chinese Office Action for 201710225909.0 dated May 18, 2018.
International Search Report for PCT/CN2018/080445 dated Jun. 29, 2018 [PCT/ISA/210].

* cited by examiner

| | |
|---|---|
| Image feature information start code | One byte |
| Image feature information data segment length | Two bytes |
| Image transparency flag | One bit |
| Dynamic image flag | One bit |
| YUV color space format | Two bits |
| Lossless mode flag | One bit |
| YUV color space value domain flag | One bit |
| Reserved bit | 10 bits |
| Image width | Two bytes |
| Image height | Two bytes |

The following bytes exist only in a dynamic picture

| | |
|---|---|
| Frame quantity | Three bytes |

FIG. 5B

| | |
|---|---|
| Frame header information start code | One byte |
| Frame header information data segment length | One byte |
| Stream data segment length | Four bytes |
| Delay time information (existing only in a dynamic picture) | Two bytes |

FIG. 8A

| | |
|---|---|
| Image frame header information start code | One byte |
| Image frame header information data segment length | One byte |
| First stream data segment length | Four bytes |
| Delay time information (existing only in a dynamic picture) | Two bytes |

FIG. 8B

| | |
|---|---|
| Transparent channel frame header information start code | One byte |
| Transparent channel frame header information data segment length | One byte |
| Second stream data segment length | Four bytes |
| Delay time information (existing only in a dynamic picture) | Two bytes |

FIG. 8C

IMAGE FILE PROCESSING METHOD, SYSTEM AND STORAGE MEDIUM

CROSS REFERENCE TO RELATED APPLICATIONS

This application is a continuation of International Application No. PCT/CN2018/080445 filed on Mar. 26, 2018, which claims priority from Chinese Patent Application No. 201710225909.0, entitled "PICTURE FILE PROCESSING METHOD AND SYSTEM" filed with the Patent Office of China on Apr. 8, 2017, the entire contents of each of which are incorporated by reference herein in their entireties.

BACKGROUND

1. Field

Embodiments relate to the field of computer technologies, and in particular, to a picture file processing method, a picture file processing system, and a storage medium.

2. Description of the Related Art

With development of the mobile Internet, downloading traffic of a terminal device is greatly increased, and among downloading traffic of a user, picture file traffic occupies a large proportion. A large quantity of picture files also cause a large pressure on network transmission bandwidth load. If a storage space occupied by a picture file may be reduced, not only a loading speed may be improved, but also a large quantity of bandwidth and storage costs may be saved.

SUMMARY

It is an aspect to provide a picture file processing method, a picture file processing system and a storage medium which may reduce a storage space occupied by a picture file to improve a loading speed, reduce storage costs, and open up bandwidth on a network.

According to an aspect of one or more embodiments, there is provided a method including parsing a picture file, to obtain a picture header information data segment, first stream data, and second stream data of a first image thereof; decoding the first stream data of the first image, to generate red-green-blue (RGB) data of the first image; decoding the second stream data of the first image, to generate Alpha data of the first image; and generating red-green-blue-alpha (RGBA) data corresponding to the first image according to the RGB data and the Alpha data of the first image, wherein the picture header information data segment comprises image feature information including an alpha channel flag.

According to additional aspects of one or more embodiments, there is also provided an apparatus and computer readable medium consistent with the method.

BRIEF DESCRIPTION OF THE DRAWINGS

Various embodiments will be described below with reference to the drawing figured in which:

FIG. 5B is a diagram of an example of an image feature information data segment according to an embodiment;

FIG. 8A is a diagram of an example of frame header information according to an embodiment;

FIG. 8B is a diagram of an example of image frame header information according to an embodiment;

FIG. 8C is a diagram of an example of transparent channel frame header information according to an embodiment;

DETAILED DESCRIPTION

The following clearly and completely describes the technical solutions in the embodiments with reference to the accompanying drawings in which various embodiments are shown. The described embodiments are only some embodiments instead of all embodiments. All other embodiments obtained by a person of ordinary skill in the art based on the embodiments of this application shall fall within the protection scope of the embodiments as defined in the accompanying claims.

Figure 1:
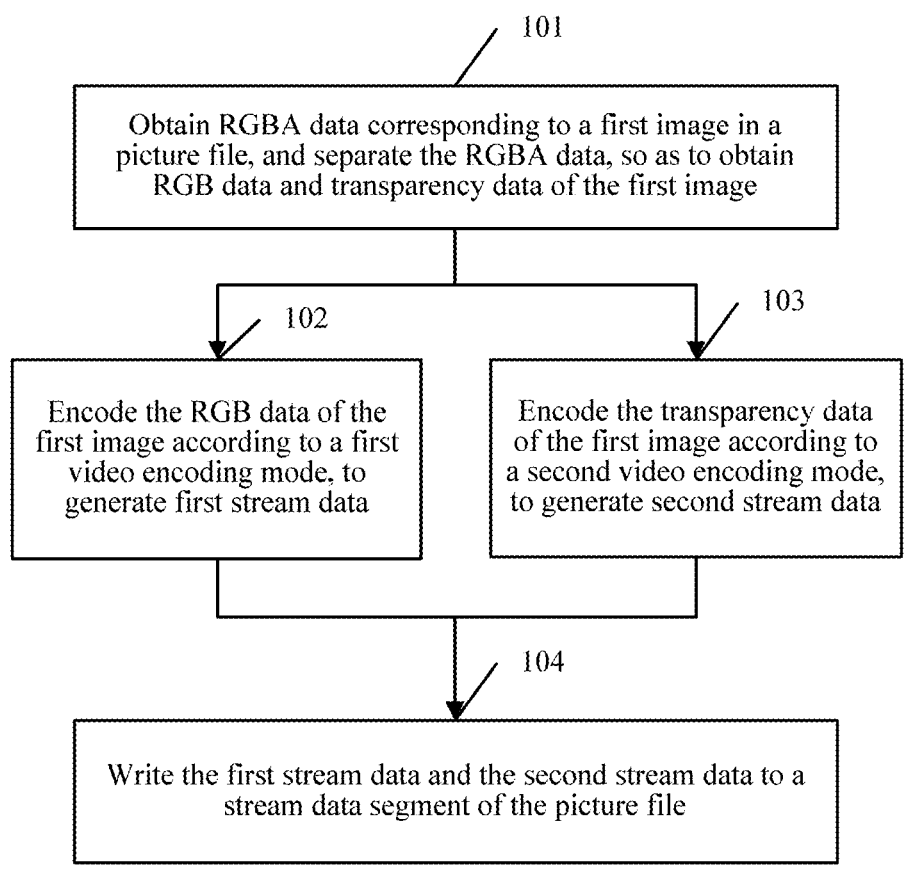
FIG. 1 is a schematic flowchart of a picture file processing method according to an embodiment.

FIG. 1 is a schematic flowchart of a picture file processing method according to an embodiment. The method is performed by a picture file processing apparatus, and the foregoing picture file processing apparatus may be a terminal device or a server. As shown in FIG. 1, the method according to this embodiment may include step 101 to step 104.

101. Obtain red-green-blue-alpha (RGBA) data corresponding to a first image in a picture file, and separate the RGBA data, so as to obtain RGB data and transparency data of the first image.

Specifically, an encoding apparatus obtains the RGBA data corresponding to the first image in the picture file, and separates the RGBA data, so as to obtain the RGB data and the transparency data of the first image. Data corresponding to the first image is the RGBA data. The RGBA data is a color space representing red, green, blue, and transparency information (Alpha). The RGBA data corresponding to the first image is separated into the RGB data and the transparency data. The RGB data is color data included in the RGBA data, and the transparency data is transparency data included in the RGBA data.

For example, if the data corresponding to the first image is the RGBA data, because the first image is formed by many pixels, and each pixel corresponds to one piece of RGBA data, the first image formed by N pixels includes N pieces of RGBA data, whose form is as follows:

RGBA, RGBA, RGBA, RGBA, RGBA, RGBA, . . . , RGBA

Therefore, in some embodiments, the encoding apparatus may separate the RGBA data of the first image, so as to obtain the RGB data and the transparency data of the first image, for example, separate the first image formed by the foregoing N pixels, and then obtain RGB data and transparency data of each pixel of the N pixels, where forms of the RGB data and the transparency data are as follows:

RGB, RGB, RGB, RGB, RGB, RGB, . . . , RGB

A, A, A, A, A, A, . . . , A

Further, after the RGB data and the transparency data of the first image are obtained, step 102 and step 103 are respectively performed.

102. Encode the RGB data of the first image according to a first video encoding mode, to generate first stream data.

Specifically, the encoding apparatus encodes the RGB data of the first image according to the first video encoding mode, to generate the first stream data. The first image may be a frame of image included in the picture file of a static format; or the first image may be any frame of image of a plurality of frames of images included in the picture file of a dynamic format.

103. Encode the transparency data of the first image according to a second video encoding mode, to generate second stream data.

Specifically, the encoding apparatus encodes the transparency data of the first image according to the second video encoding mode, to generate the second stream data.

For step 102 and step 103, the first video encoding mode or the second video encoding mode may include but is not limited to an intra-frame prediction (Intra-Prediction, I) frame encoding mode and an inter-frame prediction (Prediction, P) frame encoding mode. An I frame indicates a key frame, and when I-frame data is decoded, a complete image may be reconstructed only with a current frame of data; and a complete image may be reconstructed by a P frame only with reference to the foregoing encoded frame. In this embodiment, a video encoding mode used for each frame of image in the picture file of the static format or the picture file of the dynamic format is not limited.

For example, for the picture file of the static format, because the picture file of the static format includes only one frame of image, that is, the first image in this embodiment, I-frame encoding is performed on the RGB data and the transparency data of the first image. For another example, for the picture file of the dynamic format, the picture file of the dynamic format usually includes at least two frames of images, and therefore in this embodiment, I-frame encoding is performed on RGB data and transparency data of a first frame of image in the picture file of the dynamic format; and I-frame encoding or P-frame encoding may be performed on RGB data and transparency data of a non-first frame of image.

104. Encapsulate the first stream data and the second stream data to a stream data segment of the picture file.

Specifically, the encoding apparatus encapsulates the first stream data generated from the RGB data of the first image, and the second stream data generated from the transparency data of the first image to the stream data segment of the picture file. The first stream data and the second stream data are complete stream data corresponding to the first image, that is, the RGBA data of the first image may be obtained by decoding the first stream data and the second stream data. After the first stream data and the second stream data are written to the stream data segment of the picture file, the first image is compressed, which not only can improve a loading speed, but also can save a large quantity of bandwidth and storage costs.

It should be noted that, step 102 and step 103 are not performed in order.

It should be further noted that, in this embodiment, the RGBA data input before encoding may be obtained by decoding picture files of various formats, where a format of a picture file may be any one of formats such as Joint Photographic Experts Group (JPEG), Bitmap (BMP), Portable Network Graphic Format (PNG), Animated Portable Network Graphics (APNG), and Graphics Interchange Format (GIF). In this embodiment, the format of the picture file before encoding is not limited.

It should be further noted that, the first image in this embodiment is the RGBA data including the RGB data and the transparency data. However, when the first image includes only the RGB data, the encoding apparatus may perform step 102 on the RGB data after obtaining the RGB data corresponding to the first image, so as to generate the first stream data, and determine the first stream data as the complete stream data corresponding to the first image. In this way, the first image including only the RGB data can still be encoded according to the video encoding mode, so as to compress the first image.

In this embodiment, when the first image is the RGBA data, an encoding apparatus obtains the RGBA data corresponding to the first image in the picture file, and obtains the RGB data and the transparency data of the first image by separating the RGBA data; encodes the RGB data of the first image according to the first video encoding mode, to generate the first stream data; encodes the transparency data of the first image according to the second video encoding mode, to generate the second stream data; and encapsulates the first stream data and the second stream data to the stream data segment. In this way, encoding performed by using the video encoding modes can improve a compression ratio of the picture file, and additionally the RGB data and the transparency data in the picture file are respectively encoded, to reserve the transparency data in the picture file while using the video encoding modes, and ensure quality of the picture file.

Figure 2:
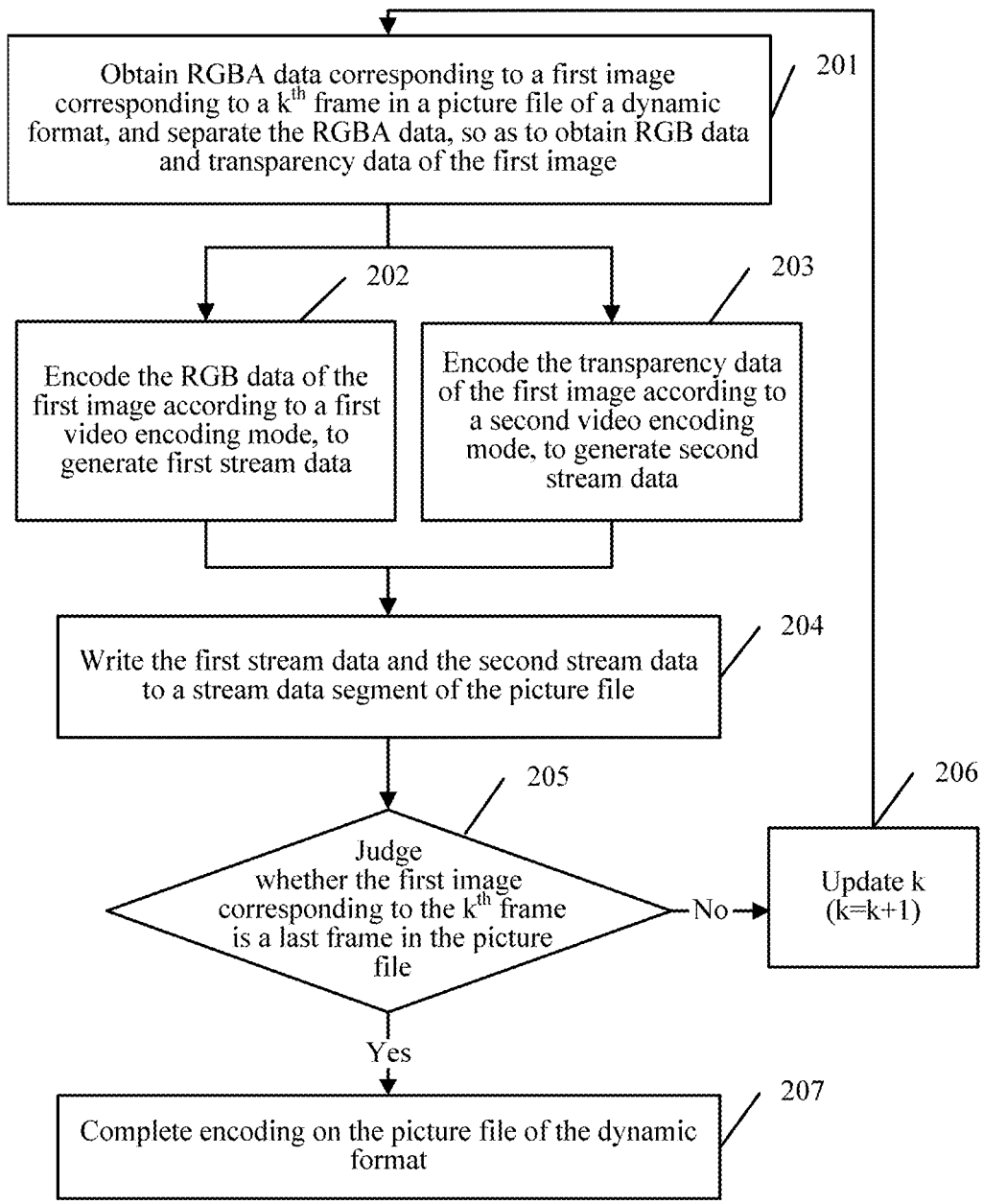
FIG. 2 is a schematic flowchart of another picture file processing method according to an embodiment.

FIG. 2 is a schematic flowchart of another picture file processing method according to an embodiment. The method is performed by a picture file processing apparatus, and the foregoing picture file processing apparatus may be a terminal device or a server. As shown in FIG. 2, the method according to this embodiment may include step 201 to step 207. In this embodiment, a picture file of a dynamic format is described. Refer to the following specific introduction.

201. Obtain RGBA data corresponding to a first image corresponding to a $k^{th}$ frame in a picture file of a dynamic format, and separate the RGBA data, so as to obtain RGB data and transparency data of the first image.

Specifically, an encoding apparatus obtains the to-be-encoded picture file of the dynamic format, where the picture file of the dynamic format includes at least two frames of images, and the encoding apparatus obtains the first image corresponding to the $k^{th}$ frame in the picture file of the dynamic format, where k is a positive integer greater than 0.

In some embodiments, the encoding apparatus may perform encoding in an order of images corresponding to all frames of the picture file of the dynamic format, that is, may first obtain an image corresponding to a first frame of the picture file of the dynamic format. In this embodiment, an order in which the encoding apparatus obtains images included in the picture file of the dynamic format is not limited.

Further, if data corresponding to the first image is the RGBA data, the RGBA data is a color space representing Red, Green, Blue, and Alpha. The RGBA data corresponding to the first image is separated into the RGB data and the transparency data. Specifically, because the first image is formed by many pixels, and each pixel corresponds to one piece of RGBA data, the first image formed by N pixels includes N pieces of RGBA data, whose form is as follows:

RGBA, RGBA, RGBA, RGBA, RGBA, RGBA, . . . , RGBA

Therefore, the encoding apparatus may separate the RGBA data of the first image, so as to obtain the RGB data and the transparency data of the first image, for example, separate the first image formed by the foregoing N pixels, and then obtain RGB data and transparency data of each pixel of the N pixels, where forms of the RGB data and the transparency data are as follows:

RGB, RGB, RGB, RGB, RGB, RGB, . . . , RGB
A, A, A, A, A, A, . . . , A

Further, after the RGB data and the transparency data of the first image are obtained, step 202 and step 203 are respectively performed.

202. Encode the RGB data of the first image according to a first video encoding mode, to generate first stream data.

Specifically, the encoding apparatus encodes the RGB data of the first image according to the first video encoding mode. The RGB data is color data obtained by separating the RGBA data corresponding to the first image.

203. Encode the transparency data of the first image according to a second video encoding mode, to generate second stream data.

Specifically, the encoding apparatus encodes the transparency data of the first image according to the second video encoding mode, to generate the second stream data. The transparency data is obtained by separating the RGBA data corresponding to the first image.

It should be noted that, step 202 and step 203 are not performed in order.

204. Encapsulate the first stream data and the second stream data to a stream data segment of the picture file.

Specifically, the encoding apparatus encapsulates the first stream data generated from the RGB data of the first image, and the second stream data generated from the transparency data of the first image to the stream data segment of the picture file. The first stream data and the second stream data are complete stream data corresponding to the first image, that is, the RGBA data of the first image may be obtained by decoding the first stream data and the second stream data.

205. Judge whether the first image corresponding to the $k^{th}$ frame is a last frame in the picture file of the dynamic format.

Specifically, the encoding apparatus judges whether the first image corresponding to the $k^{th}$ frame is the last frame in the picture file of the dynamic format, and if the first image is the last frame, it indicates that encoding on the picture file of the dynamic format has been completed, and then step 207 is performed; or if the first image is not the last frame, it indicates that the picture file of the dynamic format still has an image that has not been encoded, and then step 206 is performed.

206. If not, update k, and trigger the obtaining RGBA data corresponding to a first image corresponding to a $k^{th}$ frame in a picture file of a dynamic format, and separating the RGBA data, so as to obtain RGB data and transparency data of the first image.

Specifically, if the encoding apparatus judges that the first image corresponding to the $k^{th}$ frame is not the last frame in the picture file of the dynamic format, the encoding apparatus encodes an image corresponding to a next frame, that is, updates k by using a value of (k+1). After updating k, the encoding apparatus triggers the obtaining RGBA data corresponding to a first image corresponding to a $k^{th}$ frame in a picture file of a dynamic format, and separating the RGBA data, so as to obtain RGB data and transparency data of the first image.

It may be understood that, an image obtained by using updated k and an image obtained before k is updated are not an image corresponding to the same frame. For convenience of description, herein, the image corresponding to the $k^{th}$ frame before k is updated is set to the first image, and the image corresponding to the $k^{th}$ frame after k is updated is set to a second image, to facilitate distinguishing.

In some embodiments, when step 202 to step 204 are performed on the second image, RGBA data corresponding to the second image includes RGB data and transparency data, and the encoding apparatus encodes the RGB data of the second image according to a third video encoding mode, to generate third stream data; encodes the transparency data of the second image according to a fourth video encoding mode, to generate fourth stream data; and encapsulates the third stream data and the fourth stream data to a stream data segment of the picture file.

For step 202 and step 203, the first video encoding mode, the second video encoding mode, the third video encoding mode, or the fourth video encoding mode involved above may include but is not limited to an I-frame encoding mode and a P-frame encoding mode. An I frame indicates a key frame, and when I-frame data is decoded, a complete image may be reconstructed only with a current frame of data; and a complete image may be reconstructed by a P frame only with reference to the foregoing encoded frame. In this embodiment, a video encoding mode used for RGB data and transparency data in each frame of image in the picture file of the dynamic format is not limited. For example, RGB data and transparency data in the same frame of image may be encoded according to different video encoding modes; or may be encoded according to the same video encoding mode. RGB data in different frames of images may be encoded according to different video encoding modes; or may be encoded according to the same video encoding mode. Transparency data in different frames of images may be encoded according to different video encoding modes; or may be encoded according to the same video encoding mode.

It should be further noted that, the picture file of the dynamic format includes a plurality of stream data segments. In some embodiments, one frame of image corresponds to one stream data segment; or one stream data corresponds to one stream data segment. Therefore, the stream data segment to which the first stream data and the second stream data are written is different from the stream data segment to which the third stream data and the fourth stream data are written.

Figure 3:
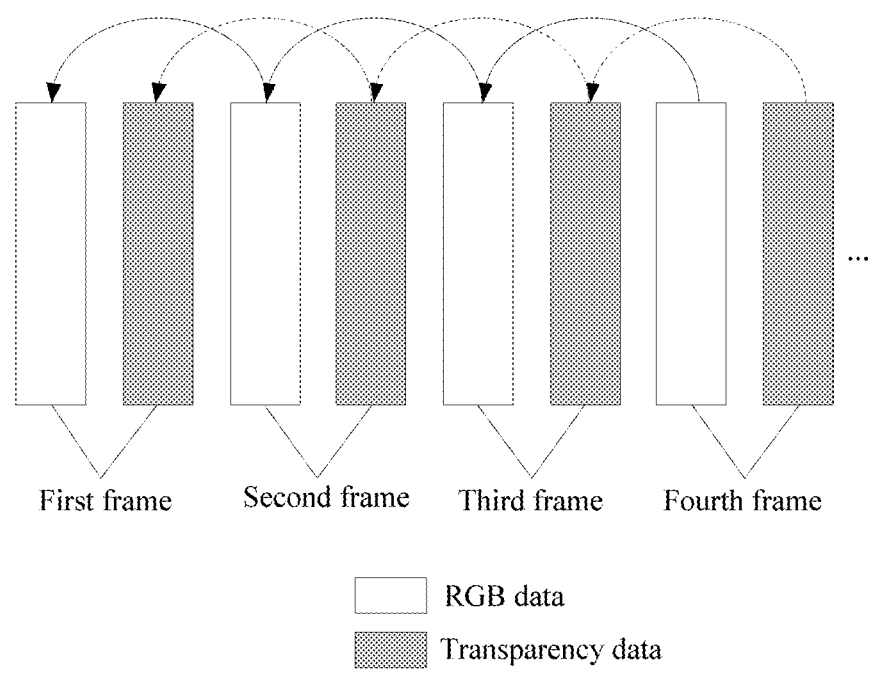
FIG. 3 is a diagram of an example of another picture file processing method according to an embodiment.

For example, FIG. 3 is a diagram of an example of a picture file processing method according to an embodiment. As shown in FIG. 3, FIG. 3 is described for a picture file of a dynamic format. The picture file of the dynamic format includes a plurality of frames of images, for example, an image corresponding to a first frame, an image corresponding to a second frame, an image corresponding to a third frame, and an image corresponding to a fourth frame, where an image corresponding to each frame includes RGB data and transparency data. In a feasible solution, the encoding apparatus may encode the RGB data and the transparency data in the image corresponding to the first frame respectively according to the I-frame encoding mode, and encode images respectively corresponding to other frames such as the second frame, the third frame, and the fourth frame according to the P-frame encoding mode, for example, may encode the RGB data in the image corresponding to the second frame according to the P-frame encoding mode with reference to the RGB data in the image corresponding to the first frame, and may encode the transparency data in the image corresponding to the second frame according to the P-frame encoding mode with reference to the transparency data in the image corresponding to the first frame. The rest may be deduced by analogy, and other frames such as the third frame and the fourth frame may be encoded by using the P-frame encoding mode with reference to the second frame.

It should be noted that, the foregoing is only an example of an encoding solution for the picture file of the dynamic format; or the encoding apparatus may further encode each of other frames such as the first frame, the second frame, the third frame, and the fourth frame by using the I-frame encoding mode.

207. If yes, complete encoding on the picture file of the dynamic format.

Specifically, if the encoding apparatus judges that the first image corresponding to the $k^{th}$ frame is the last frame in the picture file of the dynamic format, it indicates that encoding on the picture file of the dynamic format has been completed.

In some embodiments, the encoding apparatus may generate frame header information for stream data generated from an image corresponding to each frame, and generate picture header information for the picture file of the dynamic format. In this way, whether the picture file includes the transparency data may be determined by using the picture header information, and then whether only the first stream data generated from the RGB data is obtained or the first stream data generated from the RGB data and the second stream data generated from the transparency data are obtained in the decoding process may be determined.

It should be noted that, an image corresponding to each frame in the picture file of the dynamic format in this embodiment is RGBA data including RGB data and transparency data. However, when an image corresponding to each frame in the picture file of the dynamic format includes only RGB data, the encoding apparatus may perform step 202 on the RGB data of each frame of image, so as to generate the first stream data and encapsulate the first stream data to the stream data segment of the picture file, and finally determine the first stream data as complete stream data corresponding to the first image. In this way, the first image including only the RGB data can still be encoded according to the video encoding mode, so as to compress the first image.

It should be further noted that, in this embodiment, the RGBA data input before encoding may be obtained by decoding picture files of various dynamic formats, where a dynamic format of a picture file may be any one of formats such as APNG and GIF. In this embodiment, the dynamic format of the picture file before encoding is not limited.

In this embodiment, when the first image in the picture file of the dynamic format is the RGBA data, the encoding apparatus obtains the RGBA data corresponding to the first image in the picture file, and obtains the RGB data and the transparency data of the first image by separating the RGBA data; encodes the RGB data of the first image according to the first video encoding mode, to generate the first stream data; encodes the transparency data of the first image according to the second video encoding mode, to generate the second stream data; and encapsulates the first stream data and the second stream data to the stream data segment. Additionally, an image corresponding to each frame in the picture file of the dynamic format may be encoded in the manner for the first image. In this way, encoding performed by using the video encoding modes can improve a compression ratio of the picture file, and additionally the RGB data and the transparency data in the picture file are respectively encoded, to reserve the transparency data in the picture file while using the video encoding modes, and ensure quality of the picture file.

Figure 4A:
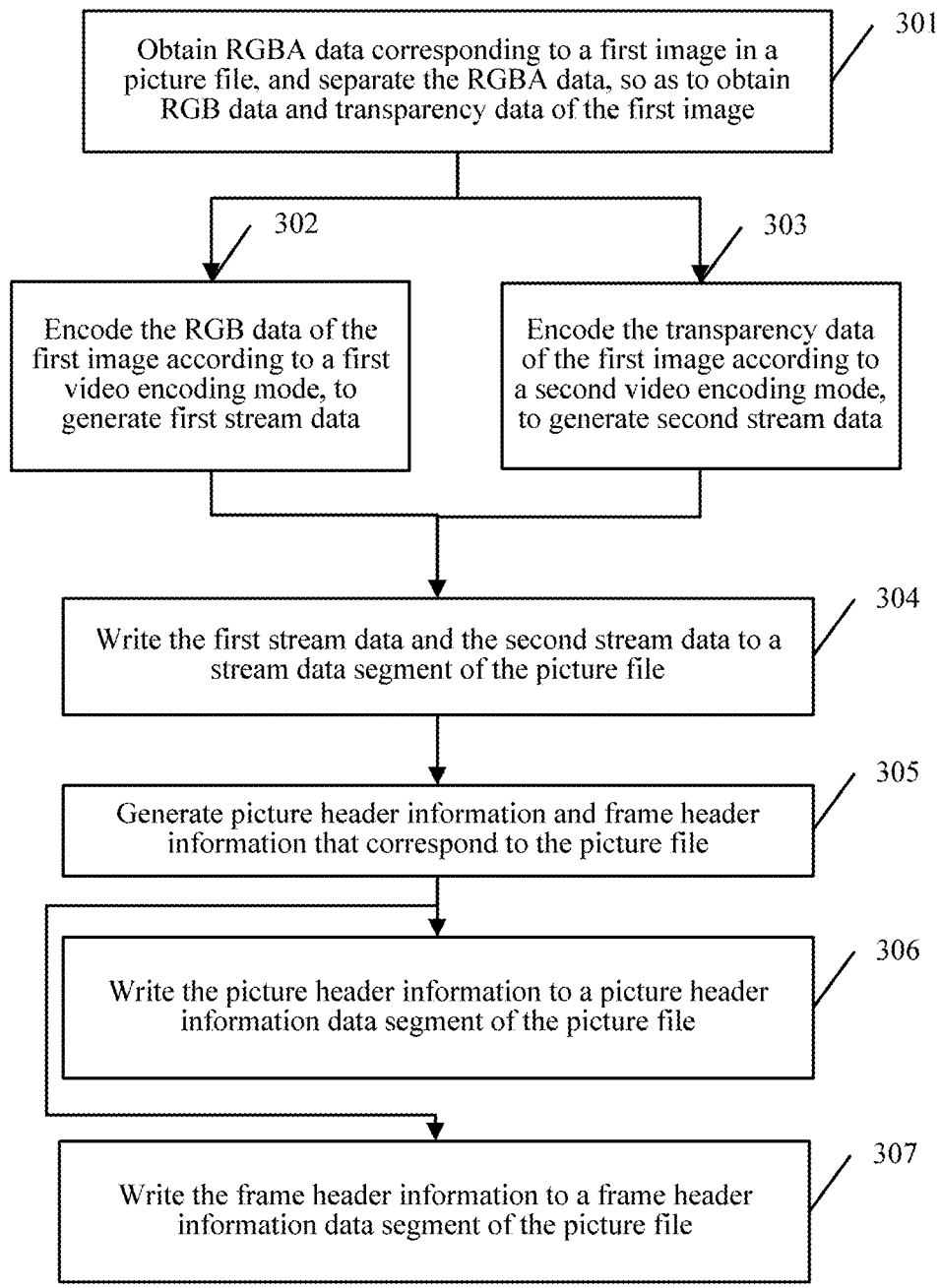
FIG. 4A is a schematic flowchart of another picture file processing method according to an embodiment.

FIG. 4A is a schematic flowchart of another picture file processing method according to an embodiment. The method is performed by a picture file processing apparatus, and the foregoing picture file processing apparatus may be a terminal device or a server. As shown in FIG. 4A, the method according to this embodiment may include step 301 to step 307.

301. Obtain RGBA data corresponding to a first image in a picture file, and separate the RGBA data, so as to obtain RGB data and transparency data of the first image.

Specifically, an encoding apparatus obtains the RGBA data corresponding to the first image in the picture file, and separates the RGBA data, so as to obtain the RGB data and the transparency data of the first image. Data corresponding to the first image is the RGBA data. The RGBA data is a color space representing Red, Green, Blue, and Alpha. The RGBA data corresponding to the first image is separated into the RGB data and the transparency data. The RGB data is color data included in the RGBA data, and the transparency data is transparency data included in the RGBA data.

For example, if the data corresponding to the first image is the RGBA data, because the first image is formed by many pixels, and each pixel corresponds to one piece of RGBA data, the first image formed by N pixels includes N pieces of RGBA data, whose form is as follows:

RGBA, RGBA, RGBA, RGBA, RGBA, RGBA, . . . , RGBA

Therefore, in some embodiments, the encoding apparatus may separate the RGBA data of the first image, so as to obtain the RGB data and the transparency data of the first image, for example, separate the first image formed by the foregoing N pixels, and then obtain RGB data and transparency data of each pixel of the N pixels, where forms of the RGB data and the transparency data are as follows:

RGB, RGB, RGB, RGB, RGB, RGB, . . . , RGB
A, A, A, A, A, A, . . . , A

Further, after the RGB data and the transparency data of the first image are obtained, step 302 and step 303 are respectively performed.

302. Encode the RGB data of the first image according to a first video encoding mode, to generate first stream data.

Specifically, the encoding apparatus encodes the RGB data of the first image according to the first video encoding mode. The first image may be a frame of image included in the picture file of a static format; or the first image may be any frame of image of a plurality of frames of images included in the picture file of a dynamic format.

In some embodiments, a specific process in which the encoding apparatus encodes the RGB data of the first image according to the first video encoding mode and generates the first stream data is: converting the RGB data of the first image into first brightness and chrominance (YUV) data; and encoding the first YUV data according to the first video encoding mode, to generate the first stream data. In a feasible solution, the encoding apparatus may convert the RGB data into the first YUV data according to a preset YUV color space format. For example, the preset YUV color space format may include but is not limited to YUV420, YUV422, and YUV444. YUV is a color encoding method used in a European television system, and is a color space used in PAL and SECAM analog color television standards. In a modern color television system, a three-tube color video camera or a color CCD video camera is usually used to capture an image, and one luminance signal Y and two color difference signals B−Y (that is, U) and R−Y (that is, V) may be obtained by processing the image. Such a method for indicating a color of an image is a YUV color space indication method, and color encoding data indicating an image by using the YUV color space indication method is YUV data.

303. Encode the transparency data of the first image according to a second video encoding mode, to generate second stream data.

Specifically, the encoding apparatus encodes the transparency data of the first image according to the second video encoding mode, to generate the second stream data.

The first video encoding mode for step 302 or the second video encoding mode for step 303 may include but is not limited to the I-frame encoding mode and the P-frame encoding mode. An I frame indicates a key frame, and when I-frame data is decoded, a complete image may be reconstructed only with a current frame of data; and a complete image may be reconstructed by a P frame only with reference to the foregoing encoded frame. In this embodiment, a video encoding mode used for each frame of image in the picture file of the static format or the picture file of the dynamic format is not limited.

For example, for the picture file of the static format, because the picture file of the static format includes only one frame of image, that is, the first image in this embodiment, I-frame encoding is performed on the RGB data and the transparency data of the first image. For another example, for the picture file of the dynamic format, the picture file of the dynamic format includes at least two frames of images, and therefore in this embodiment, I-frame encoding is performed on RGB data and transparency data of a first frame of image in the picture file of the dynamic format; and I-frame encoding or P-frame encoding may be performed on RGB data and transparency data of a non-first frame of image.

In some embodiments, a specific process in which the encoding apparatus encodes the transparency data of the first image according to the second video encoding mode and generates the second stream data is: converting the transparency data of the first image into second YUV data; and encoding the second YUV data according to the second video encoding mode, to generate the second stream data.

The converting, by the encoding the apparatus, the transparency data of the first image into second YUV data is specifically: in a feasible solution, setting, by the encoding apparatus, the transparency data of the first image to a Y component in the second YUV data, and skipping setting UV components in the second YUV data; or in another feasible solution, setting the transparency data of the first image to a Y component in the second YUV data, and setting UV components in the second YUV data to preset data. In a feasible solution, the encoding apparatus may convert the transparency data into the second YUV data according to a preset YUV color space format. For example, the preset YUV color space format may include but is not limited to YUV400, YUV420, YUV422, and YUV444, and may set the UV component according to the YUV color space format.

Further, if data corresponding to the first image is the RGBA data, the encoding apparatus obtains the RGB data and the transparency data of the first image by separating the RGBA data of the first image. Then, description is made by using an example in which the RGB data of the first image is converted into the first YUV data and the transparency data of the first image is converted into the second YUV data. Description is made by using an example in which the first image includes four pixels. The RGB data of the first image is RGB data of the four pixels, and the transparency data of the first image is transparency data of the four pixels. For a specific process of converting the RGB data and the transparency data of the first image, refer to exemplary description of FIG. 4B to FIG. 4D.

Figure 4B:
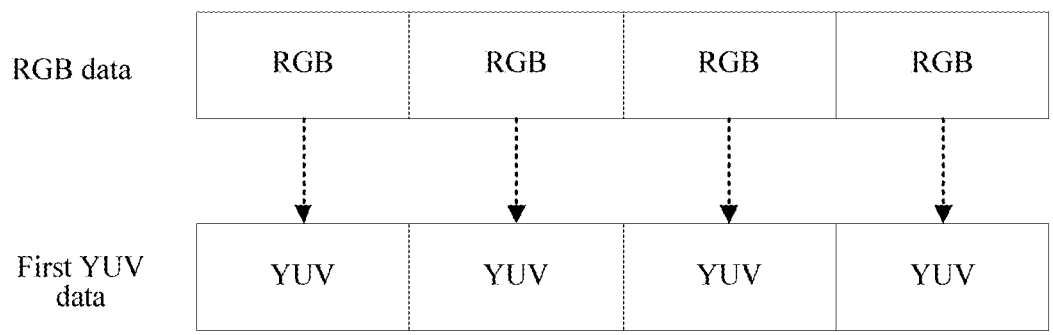
FIG. 4B is a diagram of an example of converting RGB data into YUV data according to an embodiment.

FIG. 4B is a diagram of an example of converting RGB data into YUV data according to an embodiment. As shown in FIG. 4B, RGB data includes RGB data of four pixels, and the RGB data of the four pixels is converted according to a color space conversion mode. If a YUV color space format is YUV444, RGB data of one pixel may be converted into one piece of YUV data according to a corresponding conversion formula. In this way, the RGB data of the four pixels is converted into four pieces of YUV data, and first YUV data includes the four pieces of YUV data. Conversion formulas corresponding to different YUV color space formats are different.

Figure 4C:
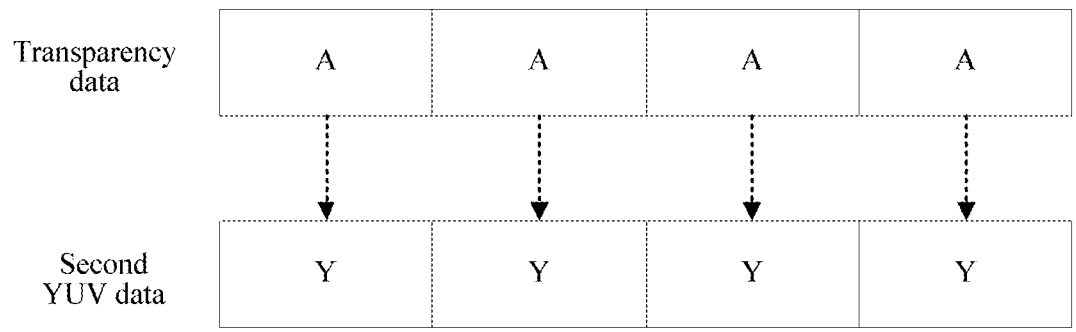
FIG. 4C is a diagram of an example of converting transparency data into YUV data according to an embodiment.
Figure 4D:
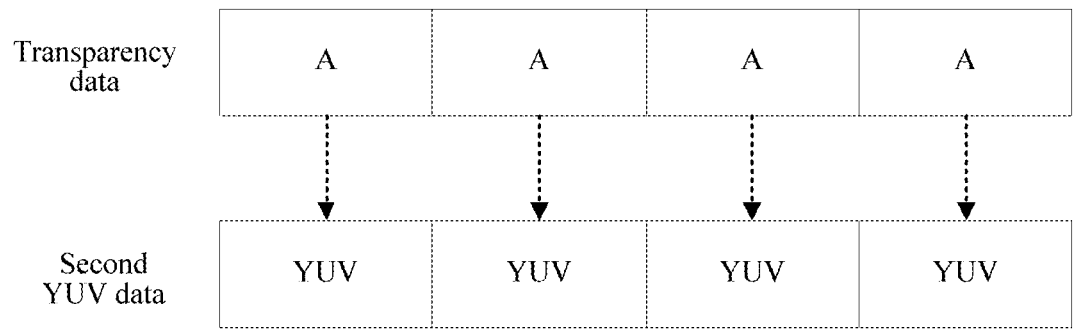
FIG. 4D is a diagram of an example of converting transparency data into YUV data according to an embodiment.

Further, FIG. 4C and FIG. 4D are respectively diagrams of an example of converting transparency data into YUV data according to an embodiment. First, as shown in FIG. 4C and FIG. 4D, transparency data includes data A of four pixels, where A indicates transparency, and transparency data of each pixel is set to a Y component; and then a YUV color space format is determined, so as to determine second YUV data.

If the YUV color space format is YUV400, UV components are not set, and Y components of the four pixels are determined as the second YUV data of the first image (as shown in FIG. 4C).

If the YUV color space format is a format in which UV components exist other than YUV400, the UV components are set to preset data, as shown in FIG. 4D. In FIG. 4D, conversion is performed by using the color space format of YUV444, that is, a U component and a V component that are preset data is set for each pixel. Additionally, for another example, if the YUV color space format is YUV422, a U component and a V component that are preset data are set for every two pixels; or if the YUV color space format is YUV420, a U component and a V component that are preset data are set for every four pixels. Other formats may be deduced by analogy, and details are not described herein again; and finally the YUV data of the four pixels is determined as the second YUV data of the first image.

It should be noted that, step 302 and step 303 are not performed in order.

304. Encapsulate the first stream data and the second stream data to a stream data segment of the picture file.

Specifically, the encoding apparatus encapsulates the first stream data generated from the RGB data of the first image, and the second stream data generated from the transparency data of the first image to the stream data segment of the picture file. The first stream data and the second stream data are complete stream data corresponding to the first image, that is, the RGBA data of the first image may be obtained by decoding the first stream data and the second stream data.

305. Generate picture header information and frame header information that correspond to the picture file.

Specifically, the encoding apparatus generates the picture header information and the frame header information that correspond to the picture file. The picture file may be a picture file of a static format, that is, includes only the first image; or the picture file is a picture file of a dynamic format, that is, includes the first image and another image. Regardless of whether the picture file is the picture file of the static format or the picture file of the dynamic format, the encoding apparatus may generate the picture header information corresponding to the picture file. The picture header information includes image feature information about whether the picture file has the transparency data, so that a decoding apparatus determines, by determining whether the picture file includes the transparency data, how to obtain stream data and whether the obtained stream data includes the second stream data generated from the transparency data.

Further, the frame header information is used to indicate the stream data segment of the picture file, so that the decoding apparatus determines, by using the frame header information, the stream data segment from which the stream data may be obtained, thereby decoding the stream data.

It should be noted that, in this embodiment, an order of step 305 of generating the picture header information and the frame header information that correspond to the picture file, and step 302, step 303, and step 304 is not limited.

306. Encapsulate the picture header information to a picture header information data segment of the picture file.

Specifically, the encoding apparatus encapsulates the picture header information to the picture header information data segment of the picture file. The picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the picture header information may further include a user customized information data segment, and the user customized information data segment includes a user customized information start code, a length of the user customized information, and user customized information; and the user customized information includes Exchangeable Image File (EXIF) information, for example, an aperture, a shutter, white balance, International Organization for Standardization (ISO), a focal length, a date, a time, and the like during photographing, a photographing condition, a camera brand, a model, color encoding, sound recorded during photographing, global positioning system data, a thumbnail, and the like, and the user customized information includes information that may be customized and set by a user. This is not limited in this embodiment.

The image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format. In some embodiments, the image feature information may further include a YUV color space format used for the picture file.

Figure 5A:
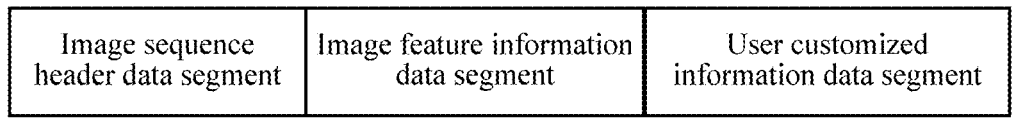
FIG. 5A is a diagram of an example of picture header information according to an embodiment.

For example, FIG. 5A is a diagram of an example of picture header information according to an embodiment. As shown in FIG. 5A, picture header information of a picture file is formed by three parts, namely, an image sequence header data segment, an image feature information data segment, and a user customized information data segment.

The image sequence header data segment includes an image file identifier, a decoder identifier, a version number, and the image feature information.

Image file identifier (image identifier): it is used to indicate a type of the picture file, and may be indicated by using a preset identifier. For example, the image file identifier occupies four bytes. For example, the image file identifier is a bit string 'AVSP', used to indicate that this is an AVS picture file.

Decoder identifier: it is used to indicate an identifier of an encoding/decoding standard used for compressing the current picture file, and is, for example, indicated by using four bytes; or may be explained as indicating a model of a decoder kernel used for current picture decoding. When an AVS2 kernel is used, code_id is 'AVS2'.

Version number: it is used to indicate a profile of an encoding/decoding standard indicated by a compression standard identifier. For example, profiles may include a baseline profile, a main profile, an extended profile, and the like. For example, an 8-bit unsigned number identifier is used. As shown in Table 1, a type of the version number is provided.

TABLE 1

| Value of version number | Profile |
| --- | --- |
| 'B' | Base Profile |
| 'M' | Main Profile |
| 'H' | High Profile |

FIG. 5B is a diagram of an example of an image feature information data segment according to an embodiment. As shown in FIG. 5B, the image feature information data segment includes an image feature information start code, an image feature information data segment length, whether there is an alpha channel flag, a dynamic image flag, a YUV color space format, a lossless mode identifier, a YUV color space value domain flag, a reserved bit, an image width, an image height, and a frame quantity. Refer to the following specific introduction.

Image feature information start code: it is a field used to indicate a start location of the image feature information data segment of the picture file, and is, for example, indicated by using one byte, and a field D0 is used.

Image feature information data segment length: it indicates a quantity of bytes occupied by the image feature information data segment, and is, for example, indicated by using two bytes. For example, for the picture file of the dynamic format, the image feature information data segment in FIG. 5B occupies nine bytes in total, and may be filled with 9; and for the picture file of the static format, the image feature information data segment in FIG. 5B occupies 12 bytes in total, and may be filled with 12.

Image transparency flag: it is used to indicate whether an image in the picture file carries transparency data, and is, for example, indicated by using one bit. 0 indicates that the image in the picture file does not carry the transparency data, and 1 indicates that the image in the picture file carries the transparency data. It may be understood that, whether there is an alpha channel and whether the transparency data is included represent the same meaning.

Dynamic image flag: it is used to indicate whether the picture file is the picture file of the dynamic format or the picture file of the static format, and is, for example, indicated by using one bit, 0 indicates that the picture file is the picture file of the static format, and 1 indicates that the picture file is the picture file of the dynamic format.

YUV color space format: it is used to indicate a chrominance component format used for converting the RGB data of the picture file into the YUV data, and is, for example, indicated by using two bits, as shown in Table 2.

TABLE 2

| Value of YUV_color space format | YUV color space format |
| --- | --- |
| 00 | 4:0:0 |
| 01 | 4:2:0 |
| 10 | 4:2:2 (reserved) |
| 11 | 4:4:4 |

Lossless mode flag: it is used to indicate whether lossless encoding or lossy compression is used, and is, for example, indicated by using one bit, 0 indicates lossy encoding, and 1 indicates lossless encoding, where if the RGB data in the picture file is directly encoded by using the video encoding mode, it indicates that lossless encoding is used; and if the RGB data in the picture file is first converted into YUV data, and then the YUV data is encoded, it indicates that lossy encoding is used.

YUV color space value domain flag: it is used to indicate that a YUV color space value domain range conforms to the ITU-R BT.601 standard, and is, for example, indicated by using one bit. 1 indicates that a value domain range of the Y component is [16, 235] and a value domain range of the UV components is [16, 240]; and 0 indicates that a value domain range of the Y component and the UV components is [0, 255].

Reserved bit: it is a 10-bit unsigned integer. Redundant bits in a byte are set to reserved bits.

Image width: it is used to indicate a width of each image in the picture file, and may be, for example, indicated by using two bytes if an image width range is between 0 and 65535.

Image height: it is used to indicate a height of each image in the picture file, and may be, for example, indicated by using two bytes if an image height range is between 0 and 65535.

Image frame quantity: it exists only in a case of the picture file of the dynamic format, is used to indicate a total quantity of frames included in the picture file, and is, for example, indicated by using three bytes.

Figure 5C:
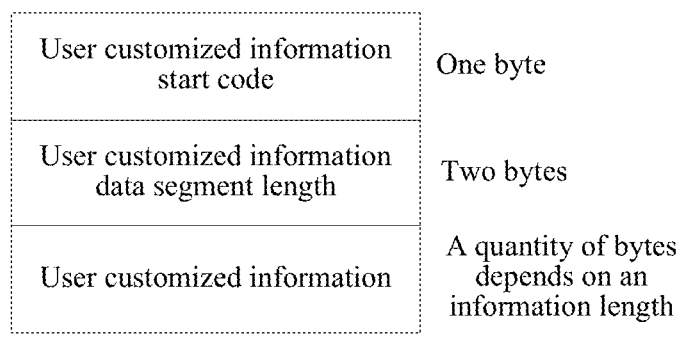
FIG. 5C is a diagram of an example of a user customized information data segment according to an embodiment.

FIG. 5C is a diagram of an example of a user customized information data segment according to an embodiment. As shown in FIG. 5C, for details, refer to the following detailed introduction.

User customized information start code: it is a field used to indicate a start location of the user customized information, and is, for example, indicated by using one byte. For example, a bit string '0x000001BC' identifies beginning of the user customized information.

User customized information data segment length: it indicates a data length of the current user customized information, and is, for example, indicated by using two bytes.

User customized information: it is used to encapsulate data that a user may introduce, for example, information such as EXIF, and a quantity of occupied bytes may be determined according to a length of the user customized information.

It should be noted that, the foregoing is only exemplary description, and in this embodiment, a name of each piece of information included in the picture header information, a location of each piece of information in the picture header information, and a quantity of bits occupied by each piece of information are not limited.

307. Encapsulate the frame header information to a frame header information data segment of the picture file.

Specifically, the encoding apparatus encapsulates the frame header information to the frame header information data segment of the picture file.

In some embodiments, one frame of image of the picture file corresponds to one piece of frame header information. Specifically, when the picture file is the picture file of the static format, the picture file of the static format includes a frame of image, that is, the first image, and therefore, the picture file of the static format includes one piece of frame header information. When the picture file is the picture file of the dynamic format, the picture file of the dynamic format usually includes at least two frames of images, and one piece of frame header information is added to each frame of image of the at least two frames of images.

Figure 6A:
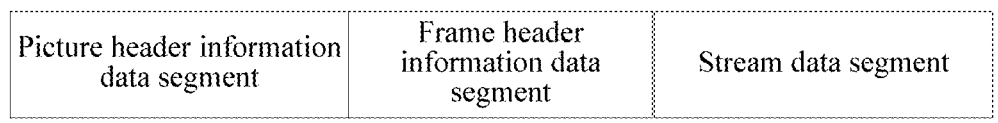
FIG. 6A is a diagram of an example of encapsulating a picture file of a static format according to an embodiment.

FIG. 6A is a diagram of an example of encapsulating a picture file of a static format according to an embodiment. As shown in FIG. 6A, the picture file includes a picture header information data segment, a frame header information data segment, and a stream data segment. The picture file of the static format includes picture header information, frame header information, and stream data that indicates an image of the picture file, and the stream data herein includes first stream data generated from RGB data of the frame of image and second stream data generated from transparency data of the frame of image. Each piece of information or data is written to a corresponding data segment. For example, the picture header information is written to the picture header information data segment; the frame header information is written to the frame header information data segment; and the stream data is written to the stream data segment. It should be noted that, because the first stream data and the second stream data in the stream data segment are obtained according to video encoding modes, the stream data segment may be described by using a video frame data segment. In this way, information written to the video frame data segment is the first stream data and the second stream data obtained by encoding the picture file of the static format.

Figure 6B:
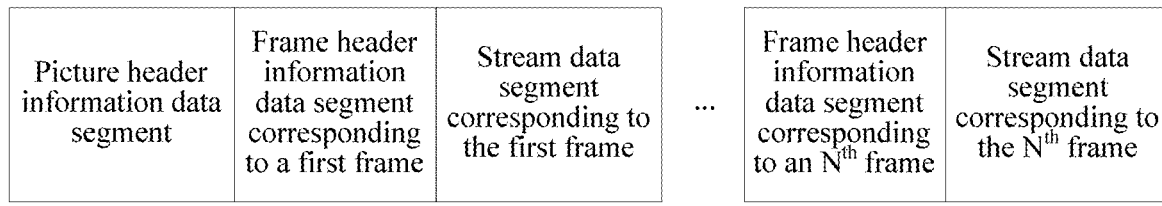
FIG. 6B is a diagram of an example of encapsulating a picture file of a dynamic format according to an embodiment.

FIG. 6B is a diagram of an example of encapsulating a picture file of a dynamic format according to an embodiment. As shown in FIG. 6B, the picture file includes a picture header information data segment, a plurality of frame header information data segments, and a plurality of stream data segments. The picture file of the dynamic format includes picture header information, a plurality of pieces of frame header information, and stream data that indicates a plurality of frames of images. Stream data corresponding to one frame of image corresponds to one piece of frame header information, where stream data indicating each frame of image includes first stream data generated from RGB data of the frame of image and second stream data generated from transparency data of the frame of image. Each piece of information or data is written to a corresponding data segment. For example, the picture header information is written to the picture header information data segment; frame header information corresponding to a first frame is written to a frame header information data segment corresponding to the first frame; and stream data corresponding to the first frame is written to a stream data segment corresponding to the first frame, and the rest may be deduced by analogy, to encapsulate frame header information corresponding to a plurality of frames to frame header information data segments corresponding to the frames, and encapsulate stream data corresponding to the frames to stream data segments corresponding to the frames. It should be noted that, because the first stream data and the second stream data in the stream data segment are obtained according to video encoding modes, the stream data segment may be described by using a video frame data segment. In this way, information written to a video frame data segment corresponding to each frame of image is the first stream data and the second stream data obtained by encoding the frame of image.

In another feasible solution, one piece of stream data in one frame of image of the picture file corresponds to one piece of frame header information. Specifically, in a case of the picture file of the static format, the picture file of the static format includes one frame of image, that is, the first image, and the first image including the transparency data corresponds to two pieces of stream data that are respectively the first stream data and the second stream data. Therefore, the first stream data in the picture file of the static format corresponds to one piece of frame header information, and the second stream data corresponds to the other piece of frame header information. In a case of the picture file of the dynamic format, the picture file of the dynamic format includes at least two frames of images, each frame of image including the transparency data corresponds to two pieces of stream data that are respectively first stream information and second stream information, and one piece of frame header information is added to each of the first stream information and the second stream information of each frame of image.

Figure 7A:
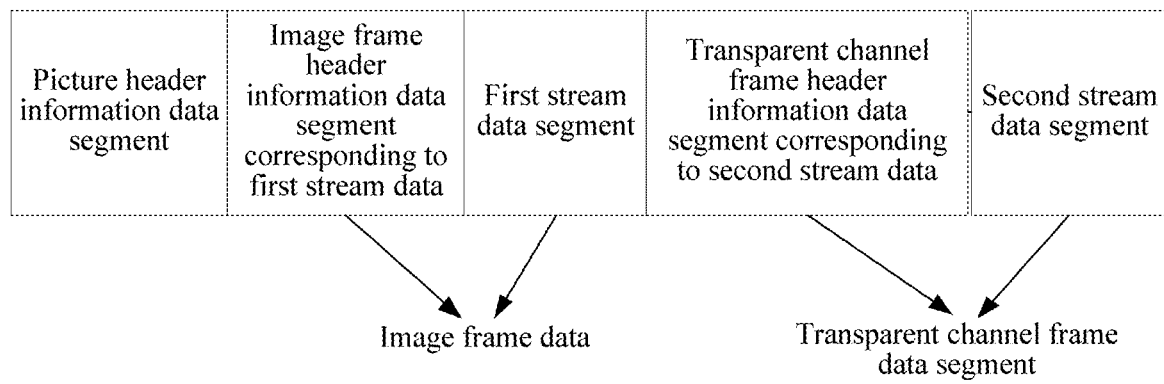
FIG. 7A is a diagram of an example of encapsulating a picture file of another static format according to an embodiment.

FIG. 7A is a diagram of an example of encapsulating a picture file of another static format according to an embodiment. To distinguish frame header information corresponding to first stream data and frame header information corresponding to second stream data, distinguishing is performed herein by using image frame header information and transparent channel frame header information, where the first stream data generated from RGB data corresponds to the image frame header information, and the second stream data generated from transparency data corresponds to the transparent channel frame header information. As shown in FIG. 7A, the picture file includes a picture header information data segment, an image frame header information data segment corresponding to the first stream data, a first stream data segment, a transparent channel frame header information data segment corresponding to the second stream data, and a second stream data segment. The picture file of the static format includes picture header information, two pieces of frame header information, and the first stream data and the second stream data that indicate one frame of image, where the first stream data is generated from RGB data of the frame of the image, and the second stream data is generated from transparency data of the frame of the image. Each piece of information or data is written to a corresponding data segment. For example, the picture header information is written to the picture header information data segment; the image frame header information corresponding to the first stream data is written to the image frame header information data segment corresponding to the first stream data; the first stream data is written to the first stream data segment; the transparent channel frame header information corresponding to the second stream data is written to the transparent channel frame header information data segment corresponding to the second stream data; and the second stream data is written to the second stream data segment. In some embodiments, the image frame header information data segment and the first stream data segment corresponding to the first stream data may be set to an image frame data segment, and the transparent channel frame header information data segment and the second stream data segment corresponding to the second stream data may be set to a transparent channel frame data segment. In this embodiment, names of data segments and names of data segments obtained by combining the data segments are not limited.

In some embodiments, when one piece of stream data in one frame of image of the picture file corresponds to one piece of frame header information, the encoding apparatus may arrange the frame header information data segment corresponding to the first stream data, the first stream data segment, the frame header information data segment corresponding to the second stream data, and the second stream data segment according to a preset order. For example, the first stream data segment, the second stream data segment, and frame header information data segments corresponding to pieces of stream data of one frame of image may be arranged according to the frame header information data segment corresponding to the first stream data, the first stream data segment, the frame header information data segment corresponding to the second stream data, and the second stream data segment. In this way, in a decoding process, a decoding apparatus can determine, in stream data segments indicated by two pieces of frame header information and two frame headers indicating the frame of image, a stream data segment from which the first stream data may be obtained, and a stream data segment from which the second stream data may be obtained. It may be understood that, herein, the first stream data is generated from the RGB data, and the second stream data is generated from the transparency data.

Figure 7B:
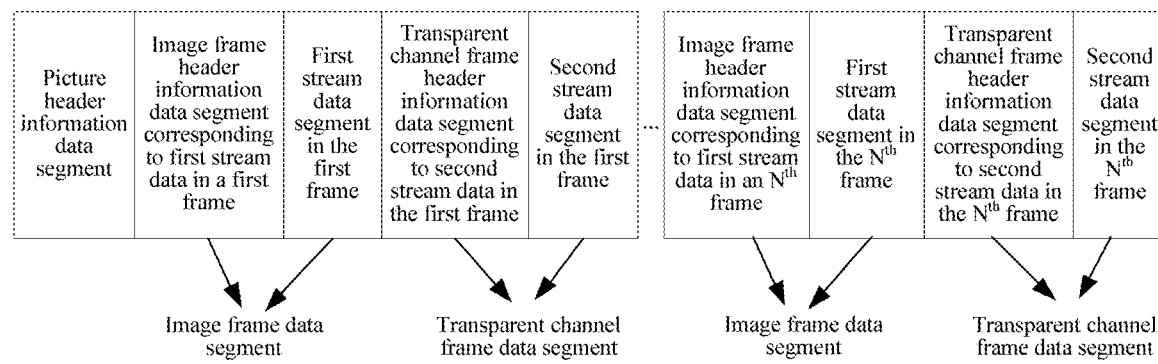
FIG. 7B is a diagram of an example of encapsulating a picture file of another dynamic format according to an embodiment.

FIG. 7B is a diagram of an example of encapsulating a picture file of another dynamic format according to an embodiment. To distinguish frame header information corresponding to first stream data and frame header information corresponding to second stream data, distinguishing is performed herein by using image frame header information and transparent channel frame header information, where the first stream data generated from RGB data corresponds to the image frame header information, and the second stream data generated from transparency data corresponds to the transparent channel frame header information. As shown in FIG. 7B, the picture file includes a picture header information data segment, a plurality of frame header information data segments, and a plurality of stream data segments. The picture file of the dynamic format includes picture header information, a plurality of pieces of frame header information, and stream data that indicates a plurality of frames of images. Each of the first stream data and the second stream data corresponding to one frame of image corresponds to one piece of frame header information, where the first stream data is generated from RGB data of the frame of the image, and the second stream data is generated from transparency data of the frame of the image. Each piece of information or data is written to a corresponding data segment. For example, the picture header information is written to the picture header information data segment; and the image frame header information corresponding to the first stream data in a first frame is written to the image frame header information data segment corresponding to the first stream data in the first frame; the first stream data corresponding to the first frame is written to the first stream data segment in the first frame; the transparent channel frame header information corresponding to the second stream data in the first frame is written to the transparent channel frame header information data segment corresponding to the second stream data in the first frame; and the second stream data corresponding to the first frame is written to a second stream data segment corresponding to the first frame, and the rest may be deduced by analogy, to encapsulate frame header information corresponding to each piece of stream data in a plurality of frames to a frame header information data segment corresponding to corresponding stream data in each frame, and encapsulate each piece of stream data in the plurality of frames to a stream data segment corresponding to corresponding stream data in each frame. In some embodiments, the image frame header information data segment and the first stream data segment corresponding to the first stream data may be set to an image frame data segment, and the transparent channel frame header information data segment and the second stream data segment corresponding to the second stream data may be set to a transparent channel frame data segment. In this embodiment, names of data segments and names of data segments obtained by combining the data segments are not limited.

Further, the frame header information includes a frame header information start code and delay time information that is used to indicate whether the picture file is a picture file of a dynamic format. In some embodiments, the frame header information further includes at least one of a frame header information data segment length and a stream data segment length of the stream data segment indicated by the frame header information. In some embodiments, the frame header information further includes specific information for distinguishing from another frame of image, for example, encoding area information, transparency information, and a color table. In this embodiment, this is not limited.

When the first stream data and the second stream data that are obtained by encoding a frame of image correspond to one piece of frame header information, for the frame header information, refer to a diagram of an example of frame header information shown in FIG. 8A. As shown in FIG. 8A, refer to the following specific introduction.

Frame header information start code: it is a field used to indicate a start location of the frame header information, and is, for example, indicated by using one byte.

Frame header information data segment length: it indicates a length of the frame header information, and is, for example, indicated by using one byte, and the information may be omitted in some embodiments.

Stream data segment length: it indicates a stream length of a stream data segment indicated by the frame header information, where if the first stream data and the second stream data correspond to one piece of frame header information, the stream length herein is a total sum of a length of the first stream data and a length of the second stream data, and the information may be omitted in some embodiments.

Delay time information: it exists only when the picture file is the picture file of the dynamic format, indicates a difference between a time at which an image corresponding to a current frame is displayed and a time at which an image corresponding to a next frame is displayed, and is, for example, indicated by using one byte.

It should be noted that, the foregoing is only exemplary description, and in this embodiment, a name of each piece of information included in the frame header information, a location of each piece of information in the frame header information, and a quantity of bits occupied by each piece of information are not limited.

When each of the first stream data and the second stream data corresponds to one piece of frame header information, the frame header information is divided into image frame header information and transparent channel frame header information, referring to FIG. 8B and FIG. 8C together.

FIG. 8B is a diagram of an example of image frame header information according to an embodiment. The image frame header information includes an image frame header information start code and delay time information that is used to indicate whether the picture file is a picture file of a dynamic format. In some embodiments, the image frame header information further includes at least one of an image frame header information data segment length and a first stream data segment length of a first stream data segment indicated by the image frame header information. In some embodiments, the image frame header information further includes specific information for distinguishing from another frame of image, for example, encoding area information, transparency information, and a color table. In this embodiment, this is not limited.

Image frame header information start code: it is a field used to indicate a start location of the image frame header information, and is, for example, indicated by using one byte, for example, a bit string '0x000001BA'.

Image frame header information data segment length: it indicates a length of the image frame header information, and is, for example, indicated by using one byte, and the information may be omitted in some embodiments.

First stream data segment length: it indicates a stream length of the first stream data segment indicated by the image frame header information, and the information may be omitted in some embodiments.

Delay time information: it exists only when the picture file is the picture file of the dynamic format, indicates a difference between a time at which an image corresponding to a current frame is displayed and a time at which an image corresponding to a next frame is displayed, and is, for example, indicated by using one byte.

FIG. 8C is a diagram of an example of transparent channel frame header information according to an embodiment. The transparent channel frame header information includes a transparent channel frame header information start code. In some embodiments, the transparent channel frame header information further includes at least one of a transparent channel frame header information data segment length, a second stream data segment length of a second stream data segment indicated by the transparent channel frame header information, and delay time information used to indicate whether the picture file is a picture file of a dynamic format. In some embodiments, the transparent channel frame header information further includes specific information for distinguishing from another frame of image, for example, encoding area information, transparency information, and a color table. In this embodiment, this is not limited.

Transparent channel frame header information start code: it is a field used to indicate a start location of the transparent channel frame header information, and is, for example, indicated by using one byte, for example, a bit string '0x000001BB'.

Transparent channel frame header information data segment length: it indicates a length of the transparent channel frame header information, and is, for example, indicated by using one byte, and the information may be omitted in some embodiments.

First stream data segment length: it indicates a stream length of the second stream data segment indicated by the transparent channel frame header information, and the information may be omitted in some embodiments.

Delay time information: it exists only when the picture file is the picture file of the dynamic format, indicates a difference between a time at which an image corresponding to a current frame is displayed and a time at which an image corresponding to a next frame is displayed, and is, for example, indicated by using one byte. The information may be omitted in some embodiments. If the transparent channel frame header information does not include delay time information, refer to the delay time information in the image frame header information.

In this embodiment, words such as the picture file, the image, the first stream data, the second stream data, the picture header information, the frame header information, each piece of information included in the picture header information, and each piece of information included in the frame header information may occur by using other names. For example, the picture file is described by using a "picture", and as long as a function of each word is similar to that in the present disclosure, the word falls within the scope of the claims of the present disclosure and an equivalent technology thereof.

It should be further noted that, in this embodiment, the RGBA data input before encoding may be obtained by decoding picture files of various formats, where a format of a picture file may be any one of formats such as JPEG, BMP, PNG, APNG, and GIF. In this embodiment, the format of the picture file before encoding is not limited.

It should be noted that, a form of each start code in this embodiment is unique in entire compressed image data, so as to play a role of uniquely identifying each data segment. The picture file involved in this embodiment is used to indicate a complete picture file or image file that may include one or more images, and an image is a frame of drawing. Video frame data involved in this embodiment is stream data obtained after video encoding is performed on each frame of image in the picture file. For example, the first stream data obtained after the RGB data is encoded may be considered as one piece of video frame data, and the second stream data obtained after the transparency data is encoded may also be considered as one piece of video frame data.

In this embodiment, when the first image is the RGBA data, the encoding apparatus obtains the RGBA data corresponding to the first image in the picture file, and obtains the RGB data and the transparency data of the first image by separating the RGBA data; encodes the RGB data of the first image according to the first video encoding mode, to generate the first stream data; encodes the transparency data of the first image according to the second video encoding mode, to generate the second stream data; generates the picture header information and the frame header information that correspond to the picture file including the first image; and finally encapsulates the first stream data and the second stream data to the stream data segment, encapsulates the picture header information to the picture header information data segment, and encapsulates the frame header information to the frame header information data segment. In this way, encoding performed by using the video encoding modes can improve a compression ratio of the picture file, and additionally the RGB data and the transparency data in the picture file are respectively encoded, to reserve the transparency data in the picture file while using the video encoding modes, and ensure quality of the picture file.

Figure 9:
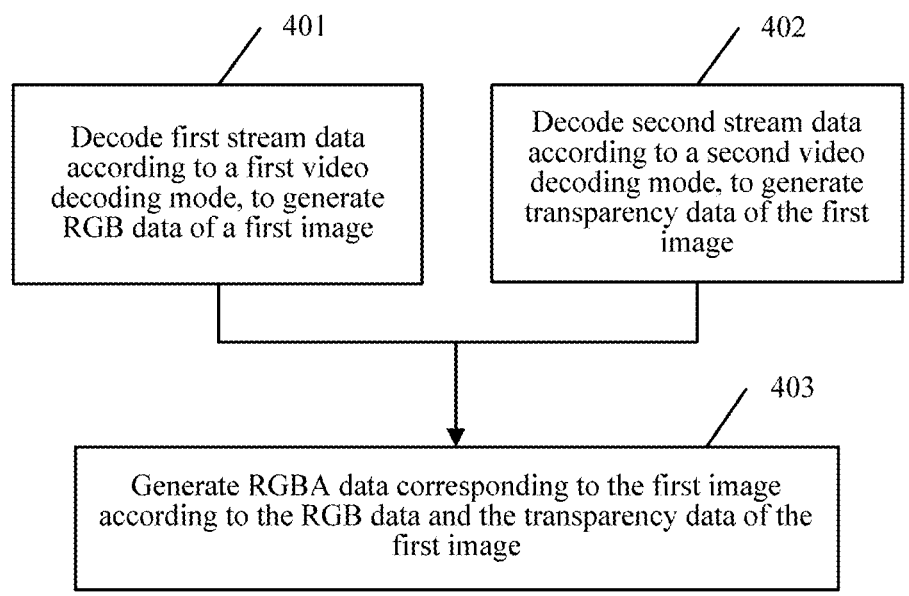
FIG. 9 is a schematic flowchart of another picture file processing method according to an embodiment.

FIG. 9 is a schematic flowchart of a picture file processing method according to an embodiment. The method is performed by a picture file processing apparatus, and the foregoing picture file processing apparatus may be a terminal device or a server. As shown in FIG. 9, the method according to this embodiment may include step 401 to step 403.

401. Decode first stream data according to a first video decoding mode, to generate RGB data of a first image.

Specifically, a decoding apparatus decodes the first stream data according to the first video decoding mode. The first stream data and the second stream data are data that is generated from the first image and that is read from a stream data segment by the decoding apparatus by parsing a picture file, and stream data about the first image is obtained, where the first image is an image included in the picture file. When the picture file includes transparency data, the decoding apparatus obtains the first stream data and the second stream data indicating the first image. The first image may be a frame of image included in the picture file of a static format; or the first image may be any frame of image of a plurality of frames of images included in the picture file of a dynamic format.

In some embodiments, when the picture file includes the RGB data and the transparency data, the picture file has information used to indicate a stream data segment, and for the picture file of the dynamic format, the picture file has information used to indicate stream data segments corresponding to different frames of images, so that the decoding apparatus can obtain the first stream data generated from the RGB data of the first image and the second stream data generated from the transparency data of the first image.

Further, the decoding apparatus decodes the first stream data, so as to generate the RGB data of the first image.

402. Decode second stream data according to a second video decoding mode, to generate transparency data of the first image.

Specifically, the decoding apparatus decodes the second stream data according to the second video decoding mode, to generate the transparency data of the first image. The second stream data is also read in the same manner as that of reading the first stream data in step 401.

For step 401 and step 402, the first video decoding mode or the second video decoding mode may be determined according to a video encoding mode used for generating the first stream data or generating the second stream data. For example, description is made by using the first stream data as an example. If I-frame encoding is used for the first stream data, the first video encoding mode is that the RGB data may be generated according to the current stream data; or if P-frame encoding is used for the first stream data, the first video encoding mode is that the RGB data of the current frame is generated according to the foregoing decoded data. For the second video encoding mode, refer to introduction of the first video encoding mode. Details are not described herein again.

It should be noted that, step 401 and step 402 are not performed in order.

403. Generate RGBA data corresponding to the first image according to the RGB data and the transparency data of the first image.

Specifically, the decoding apparatus generates the RGBA data corresponding to the first image according to the RGB data and the transparency data of the first image. The RGBA data is a color space representing Red, Green, Blue, and Alpha. The RGB data and the transparency data may be combined into the RGBA data. In this way, corresponding RGBA data may be generated, by using a corresponding video decoding mode, from stream data obtained by performing encoding according to a video encoding mode, to reserve the transparency data in the picture file while using the video encoding mode, and ensure quality and a presentation effect of the picture file.

For example, forms of the RGB data and the transparency data of the first image obtained by performing decoding by the decoding apparatus are as follows:
RGB, RGB, RGB, RGB, RGB, RGB, . . . , RGB
A, A, A, A, A, A, . . . , A The decoding apparatus combines the RGB data and the transparency data corresponding to each other, so as to obtain the RGBA data of the first image, whose form is as follows:
RGBA, RGBA, RGBA, RGBA, RGBA, RGBA, . . . , RGBA It should be noted that, the picture file in this embodiment includes the RGB data and the transparency data, and therefore the first stream data from which the RGB data may be generated and the second stream data from which the transparency data may be generated may be read by parsing the picture file, and step 401 and step 402 are respectively performed. However, when the picture file includes only the RGB data, the first stream data from which the RGB data may be generated may be read by parsing the picture file, and step 401 is performed, to generate the RGB data, that is, complete decoding on the first stream data.

In this embodiment, the decoding apparatus decodes the first stream data according to the first video decoding mode, to generate the RGB data of the first image; decodes the second stream data according to the second video decoding mode, to generate the transparency data of the first image; and generates the RGBA data corresponding to the first image according to the RGB data and the transparency data of the first image. The first stream data and the second stream data in the picture file are respectively decoded, thereby obtaining the RGBA data, to reserve the transparency data in the picture file while using the video encoding mode, and ensure quality of the picture file.

Figure 10:
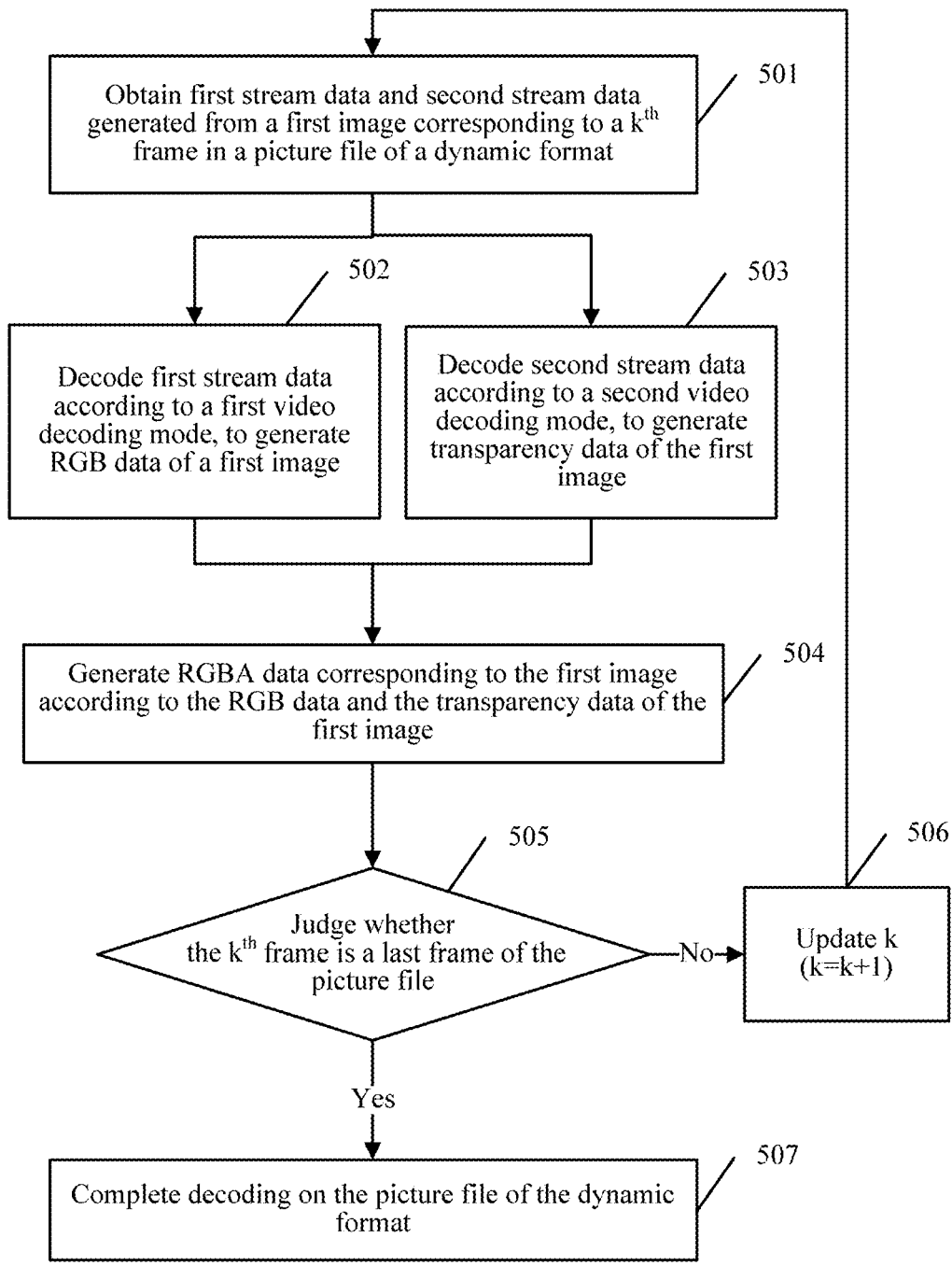
FIG. 10 is a schematic flowchart of another picture file processing method according to an embodiment.

FIG. 10 is a schematic flowchart of another picture file processing method according to an embodiment. The method is performed by a picture file processing apparatus, and the foregoing picture file processing apparatus may be a terminal device or a server. As shown in FIG. 10, the method according to this embodiment may include step 501 to step 507. In this embodiment, a picture file of a dynamic format is described. Refer to the following specific introduction.

501. Obtain first stream data and second stream data generated from a first image corresponding to a $k^{th}$ frame in a picture file of a dynamic format.

Specifically, a decoding apparatus parses the picture file of the dynamic format, to obtain, from a stream data segment of the picture file, the first stream data and the second stream data generated from the first image corresponding to the $k^{th}$ frame. When the picture file includes transparency data, the decoding apparatus obtains the first stream data and the second stream data indicating the first image. The picture file of the dynamic format includes at least two frames of images, and the $k^{th}$ frame may be any one of the at least two frames of images, where k is a positive integer greater than 0.

In some embodiments, when the picture file of the dynamic format includes the RGB data and the transparency data, the picture file has information used to indicate stream data segments corresponding to different frames of images, so that the decoding apparatus can obtain the first stream data generated from the RGB data of the first image and the second stream data generated from the transparency data of the first image.

In some embodiments, the decoding apparatus may perform decoding in an order of stream data corresponding to all frames of the picture file of the dynamic format, that is, may first obtain and decode stream data corresponding to a first frame of the picture file of the dynamic format. In this embodiment, an order in which the decoding apparatus obtains the stream data, indicating all frames of images, of the picture file of the dynamic format is not limited.

In some embodiments, the decoding apparatus may determine, by using picture header information and frame header information of the picture file, the stream data indicating an image corresponding to each frame. Refer to specific introduction about the picture header information and the frame header information in a next embodiment.

502. Decode first stream data according to a first video decoding mode, to generate RGB data of a first image.

Specifically, the decoding apparatus decodes the first stream data according to the first video decoding mode, to generate the RGB data of the first image. In some embodiments, the decoding apparatus decodes the first stream data according to the first video decoding mode, to generate first YUV data of the first image; and converts the first YUV data into the RGB data of the first image.

503. Decode second stream data according to a second video decoding mode, to generate transparency data of the first image.

Specifically, the decoding apparatus decodes the second stream data according to the second video decoding mode, to generate the transparency data of the first image. In some embodiments, the second stream data is decoded according to the second video decoding mode, to generate second YUV data of the first image; and the second YUV data is converted into the transparency data of the first image.

For example, forms of the RGB data and the transparency data of the first image obtained by performing decoding by the decoding apparatus are as follows:

RGB, RGB, RGB, RGB, RGB, RGB, . . . , RGB

A, A, A, A, A, A, . . . , A

The decoding apparatus combines the RGB data and the transparency data corresponding to each other, so as to obtain the RGBA data of the first image, whose form is as follows:

RGBA, RGBA, RGBA, RGBA, RGBA, RGBA, . . . , RGBA

It should be noted that, step 502 and step 503 are not performed in order.

504. Generate RGBA data corresponding to the first image according to the RGB data and the transparency data of the first image.

Specifically, the decoding apparatus generates the RGBA data corresponding to the first image according to the RGB data and the transparency data of the first image. The RGBA data is a color space representing Red, Green, Blue, and Alpha. The RGB data and the transparency data may be combined into the RGBA data. In this way, corresponding RGBA data may be generated, by using a corresponding video decoding mode, from stream data obtained by performing encoding according to a video encoding mode, to reserve the transparency data in the picture file while using the video encoding mode, and ensure quality and a presentation effect of the picture file.

505. Judge whether the $k^{th}$ frame is a last frame of the picture file of the dynamic format.

Specifically, the decoding apparatus judges whether the $k^{th}$ frame is the last frame of the picture file of the dynamic format. In some embodiments, whether decoding on the picture file is completed may be determined by detecting a quantity of frames included in the picture header information. If the $k^{th}$ frame is the last frame of the picture file of the dynamic format, it indicates that decoding on the picture file of the dynamic format has been completed, and step 507 is performed; or if the $k^{th}$ frame is not the last frame of the picture file of the dynamic format, step 506 is performed.

506. If not, update k, and trigger the obtaining first stream data and second stream data generated from a first image corresponding to a $k^{th}$ frame in a picture file of a dynamic format.

Specifically, if it is judged that the $k^{th}$ frame is not the last frame of the picture file of the dynamic format, stream data of an image corresponding to a next frame is decoded, that is, k is updated by using a value of (k+1). After k is updated, the obtaining first stream data and second stream data generated from a first image corresponding to a $k^{th}$ frame in a picture file of a dynamic format is triggered.

It may be understood that, an image obtained by using updated k and an image obtained before k is updated are not an image corresponding to the same frame. For convenience of description, herein, the image corresponding to the $k^{th}$ frame before k is updated is set to the first image, and the image corresponding to the $k^{th}$ frame after k is updated is set to a second image, to facilitate distinguishing.

When step 502 to step 504 are performed on the second image, in some embodiments, stream data indicating the second image is third stream data and fourth stream data; the third stream data is decoded according to a third video decoding mode, to generate RGB data of the second image; the fourth stream data is decoded according to a fourth video decoding mode, to generate transparency data of the second image, where the third stream data is generated according to the RGB data of the second image, and the fourth stream data is generated according to the transparency data of the second image; and RGBA data corresponding to the second image is generated according to the RGB data and the transparency data of the second image.

For step 502 and step 503, the first video decoding mode, the second video decoding mode, the third video decoding mode, or the fourth video decoding mode involved above is determined according to a video encoding mode used for generating stream data. For example, description is made by using the first stream data as an example. If I-frame encoding is used for the first stream data, the first video encoding mode is that the RGB data may be generated according to the current stream data; or if P-frame encoding is used for the first stream data, the first video encoding mode is that the RGB data of the current frame is generated according to the foregoing decoded data. For another video encoding mode, refer to introduction of the first video encoding mode. Details are not described herein again.

It should be further noted that, the picture file of the dynamic format includes a plurality of stream data segments. In some embodiments, one frame of image corresponds to one stream data segment; or one stream data corresponds to one stream data segment. Therefore, the stream data segment from which the first stream data and the second stream data are read is different from the stream data segment from which the third stream data and the fourth stream data are read.

507. If yes, complete decoding on the picture file of the dynamic format.

Specifically, if it is judged that the $k^{th}$ frame is the last frame of the picture file of the dynamic format, it indicates that decoding on the picture file of the dynamic format has been completed.

In some embodiments, the decoding apparatus may generate frame header information for stream data generated from an image corresponding to each frame, and generate picture header information for the picture file of the dynamic format. In this way, whether the picture file includes the transparency data may be determined by using the picture header information, and then whether only the first stream data generated from the RGB data is obtained or the first stream data generated from the RGB data and the second stream data generated from the transparency data are obtained in the decoding process may be determined.

It should be noted that, an image corresponding to each frame in the picture file of the dynamic format in this embodiment is RGBA data including RGB data and transparency data. However, when an image corresponding to each frame in the picture file of the dynamic format includes only RGB data, stream data indicating each frame of image is only the first stream data, and therefore the decoding apparatus may perform step 502 on the first stream data indicating each frame of image, so as to generate the RGB data. In this way, the stream data including only the RGB data may still be decoded by using a video decoding mode.

In this embodiment, when it is determined that the picture file of the dynamic format includes the RGB data and the transparency data, the decoding apparatus decodes the first stream data indicating each frame of image according to the first video decoding mode, to generate the RGB data of the first image; decodes the second stream data indicating each frame of image according to the second video decoding mode, to generate the transparency data of the first image; and generates the RGBA data corresponding to the first image according to the RGB data and the transparency data of the first image. The first stream data and the second stream data in the picture file are respectively decoded, thereby obtaining the RGBA data, to reserve the transparency data in the picture file while using the video encoding mode, and ensure quality of the picture file.

Figure 11:
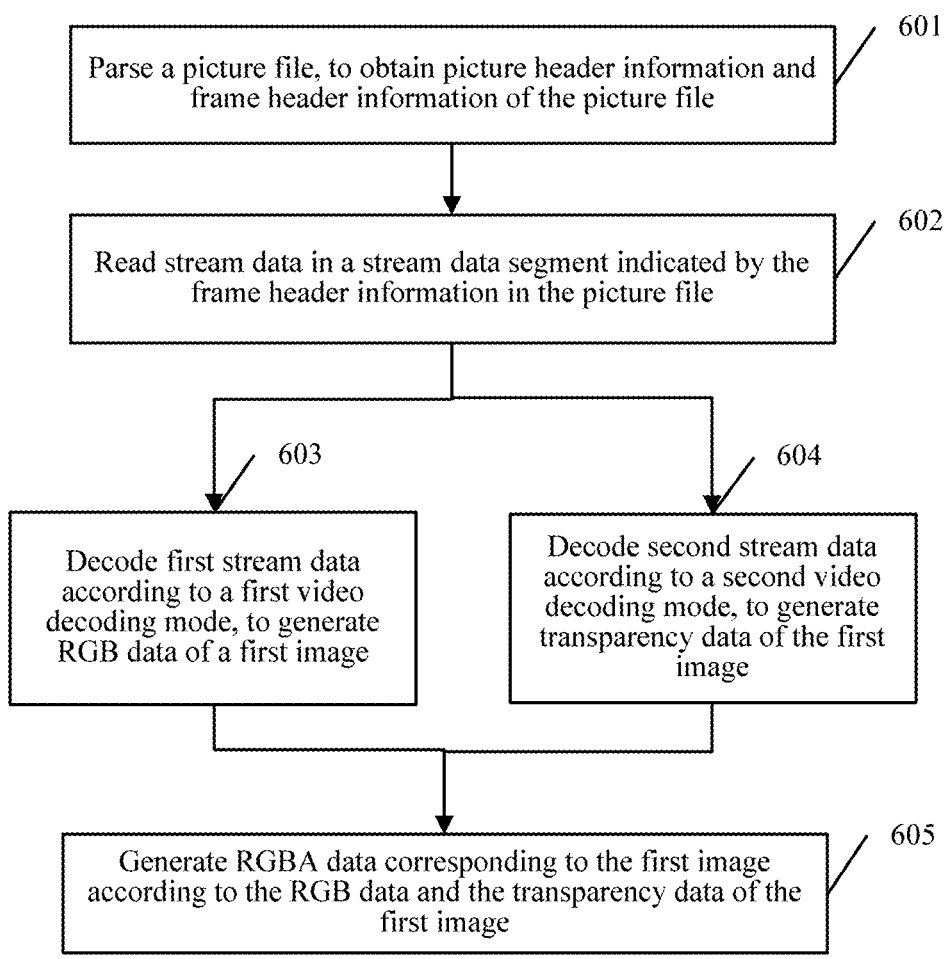
FIG. 11 is a schematic flowchart of another picture file processing method according to an embodiment.

FIG. 11 is a schematic flowchart of another picture file processing method according to an embodiment. The method is performed by a picture file processing apparatus, and the foregoing picture file processing apparatus may be a terminal device or a server. As shown in FIG. 11, the method according to this embodiment may include step 601 to step 606.

601. Parse a picture file, to obtain picture header information and frame header information of the picture file.

Specifically, a decoding apparatus parses the picture file, to obtain the picture header information and the frame header information of the picture file. The picture header information includes image feature information about whether the picture file has the transparency data, and it may be determined, by determining whether the picture file includes the transparency data, how to obtain stream data and whether the obtained stream data includes the second stream data generated from the transparency data. The frame header information is used to indicate the stream data segment of the picture file, and the stream data segment from which the stream data may be obtained may be determined by using the frame header information, thereby decoding the stream data. For example, the frame header information includes a frame header information start code, and the stream data segment may be determined by identifying the frame header information start code.

In some embodiments, the parsing, by the decoding apparatus, the picture file, to obtain the picture header information of the picture file may be specifically: reading the picture header information of the picture file from a picture header information data segment of the picture file. The picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the picture header information may further include a user customized information data segment, and the user customized information data segment includes identifier information corresponding to the user customized information, a length of the user customized information, and user customized information; and the user customized information includes EXIF information, for example, an aperture, a shutter, white balance, ISO, a focal length, a date, a time, and the like during photographing, a photographing condition, a camera brand, a model, color encoding, sound recorded during photographing, global positioning system data, a thumbnail, and the like.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format. In some embodiments, the image feature information may further include a YUV color space format used for the picture file.

In some embodiments, the parsing, by the decoding apparatus, the picture file, to obtain the frame header information of the picture file may be specifically: reading the frame header information of the picture file from a frame header information data segment of the picture file. The frame header information includes a frame header information start code and delay time information that is used to indicate whether the picture file is a picture file of a dynamic format. In some embodiments, the frame header information further includes at least one of a frame header information data segment length and a stream data segment length of the stream data segment indicated by the frame header information. In some embodiments, the frame header information further includes specific information for distinguishing from another frame of image, for example, encoding area information, transparency information, and a color table. In this embodiment, this is not limited.

It should be noted that, for the picture header information and the frame header information in this embodiment, refer to exemplary description in FIG. 5A, FIG. 5B, FIG. 5C, FIG. 6A, FIG. 6B, FIG. 7A, FIG. 7B, FIG. 8A, FIG. 8B, and FIG. 8C. Details are not described herein again.

602. Read stream data in a stream data segment indicated by the frame header information in the picture file.

Specifically, if it is determined according to the image feature information that the picture file includes transparency data, the decoding apparatus reads the stream data in the stream data segment indicated by the frame header information in the picture file. The stream data includes first stream data and second stream data.

In a feasible solution, one frame of image of the picture file corresponds to one piece of frame header information, that is, the frame header information may be used to indicate the stream data segment including the first stream data and the second stream data. Specifically, when the picture file is the picture file of the static format, the picture file of the static format includes a frame of image, that is, the first image, and therefore, the picture file of the static format includes one piece of frame header information. When the picture file is the picture file of the dynamic format, the picture file of the dynamic format usually includes at least two frames of images, and there is one piece of frame header information for each frame of image of the at least two frames of images. If it is determined that the picture file includes the transparency data, the decoding apparatus reads the first stream data and the second stream data according to the stream data segment indicated by the frame header information.

In another feasible solution, one piece of stream data in one frame of image of the picture file corresponds to one piece of frame header information, that is, a stream data segment indicated by one piece of frame header information includes one piece of stream data. Specifically, in a case of the picture file of the static format, the picture file of the static format includes one frame of image, that is, the first image, and the first image including the transparency data corresponds to two pieces of stream data that are respectively the first stream data and the second stream data. Therefore, the first stream data in the picture file of the static format corresponds to one piece of frame header information, and the second stream data corresponds to the other piece of frame header information. In a case of the picture file of the dynamic format, the picture file of the dynamic format includes at least two frames of images, each frame of image including the transparency data corresponds to two pieces of stream data that are respectively first stream information and second stream information, and one piece of frame header information is added to each of the first stream information and the second stream information of each frame of image. Therefore, if it is determined that the picture file includes the transparency data, the decoding apparatus respectively obtains the first stream data and the second stream data according to two stream data segments respectively indicated by two pieces of frame header information.

It should be noted that, when one piece of stream data in one frame of image of the picture file corresponds to one piece of frame header information, the encoding apparatus may arrange the frame header information data segment corresponding to the first stream data, the first stream data segment, the frame header information data segment corresponding to the second stream data, and the second stream data segment according to a preset order, and the decoding apparatus may determine an arrangement order of the encoding apparatus. For example, the first stream data segment, the second stream data segment, and frame header information data segments corresponding to pieces of stream data of one frame of image may be arranged according to the frame header information data segment corresponding to the first stream data, the first stream data segment, the frame header information data segment corresponding to the second stream data, and the second stream data segment. In this way, in a decoding process, the decoding apparatus can determine, in stream data segments indicated by two pieces of frame header information and two frame headers indicating the frame of image, a stream data segment from which the first stream data may be obtained, and a stream data segment from which the second stream data may be obtained. It may be understood that, herein, the first stream data is generated from the RGB data, and the second stream data is generated from the transparency data.

603. Decode first stream data according to a first video decoding mode, to generate RGB data of a first image.

604. Decode second stream data according to a second video decoding mode, to generate transparency data of the first image.

605. Generate RGBA data corresponding to the first image according to the RGB data and the transparency data of the first image.

For step 603 to step 605, refer to specific description of corresponding steps in embodiments in FIG. 9 and FIG. 10. Details are not described herein again.

In this embodiment, when the picture file includes the RGB data and the transparency data, the decoding apparatus parses the picture file, to obtain the picture header information and the frame header information of the picture file, and reads the stream data in the stream data segment indicated by the frame header information in the picture file; decodes the first stream data indicating each frame of image according to the first video decoding mode, to generate the RGB data of the first image; decodes the second stream data indicating each frame of image according to the second video decoding mode, to generate the transparency data of the first image; and generates the RGBA data corresponding to the first image according to the RGB data and the transparency data of the first image. The first stream data and the second stream data in the picture file are respectively decoded, thereby obtaining the RGBA data, to reserve the transparency data in the picture file while using the video encoding mode, and ensure quality of the picture file.

Figure 12:
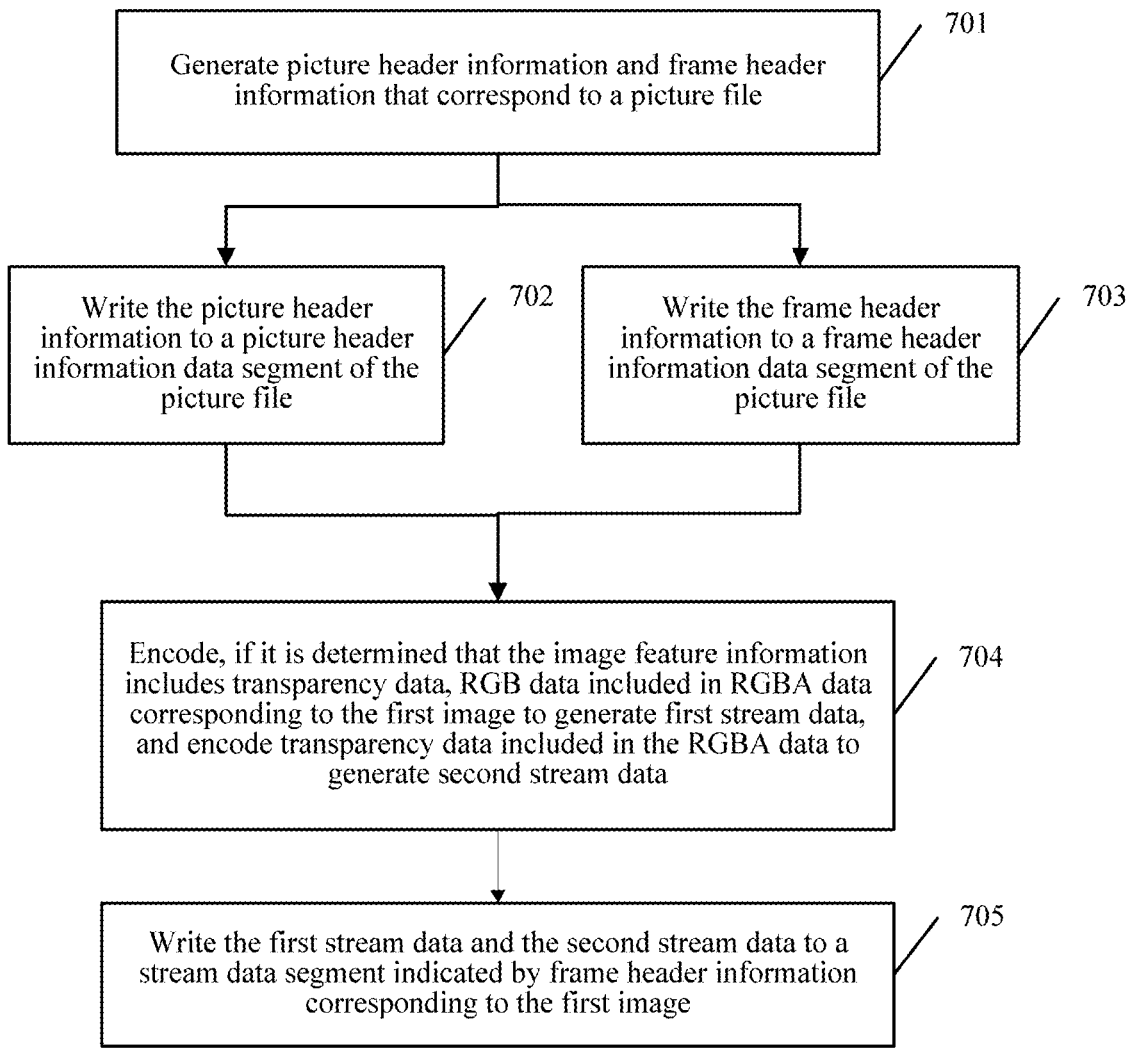
FIG. 12 is a schematic flowchart of another picture file processing method according to an embodiment.

FIG. 12 is a schematic flowchart of another picture file processing method according to an embodiment. The method is performed by a picture file processing apparatus, and the foregoing picture file processing apparatus may be a terminal device or a server. As shown in FIG. 12, the method according to this embodiment may include step 701 to step 705.

701. Generate picture header information and frame header information that correspond to a picture file.

Specifically, the picture file processing apparatus generates the picture header information and the frame header information that correspond to the picture file. The picture file may be a picture file of a static format, that is, includes only the first image; or the picture file is a picture file of a dynamic format, that is, includes the first image and another image. Regardless of whether the picture file is the picture file of the static format or the picture file of the dynamic format, the picture file processing apparatus may generate the picture header information corresponding to the picture file. The picture header information includes image feature information about whether the picture file has the transparency data, so that a decoding apparatus determines, by determining whether the picture file includes the transparency data, how to obtain stream data and whether the obtained stream data includes the second stream data generated from the transparency data.

Further, the frame header information is used to indicate the stream data segment of the picture file, so that the decoding apparatus determines, by using the frame header information, the stream data segment from which the stream data may be obtained, thereby decoding the stream data. For example, the frame header information includes a frame header information start code, and the stream data segment may be determined by identifying the frame header information start code.

In some embodiments, the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the picture header information may further include a user customized information data segment, and the user customized information data segment includes identifier information corresponding to the user customized information, a length of the user customized information, and user customized information; and the user customized information includes EXIF information, for example, an aperture, a shutter, white balance, ISO, a focal length, a date, a time, and the like during photographing, a photographing condition, a camera brand, a model, color encoding, sound recorded during photographing, global positioning system data, a thumbnail, and the like.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format. In some embodiments, the image feature information may further include a YUV color space format used for the picture file.

In some embodiments, the frame header information includes a frame header information start code and delay time information that is used to indicate whether the picture file is a picture file of a dynamic format. In some embodiments, the frame header information further includes at least one of a frame header information data segment length and a stream data segment length of the stream data segment indicated by the frame header information. Further, in some embodiments, the frame header information further includes specific information for distinguishing from another frame of image, for example, encoding area information, transparency information, and a color table. In this embodiment, this is not limited.

702. Encapsulate the picture header information to a picture header information data segment of the picture file.

Specifically, the picture file processing apparatus encapsulates the picture header information to the picture header information data segment of the picture file.

703. Encapsulate the frame header information to a frame header information data segment of the picture file.

Specifically, the picture file processing apparatus encapsulates the frame header information to the frame header information data segment of the picture file.

704. Encode, if it is determined that the image feature information includes transparency data, RGB data included in RGBA data corresponding to the first image to generate first stream data, and encode transparency data included in the RGBA data to generate second stream data.

Specifically, if it is determined that the image feature information includes transparency data, the picture file processing apparatus encodes the RGB data included in the RGBA data corresponding to the first image to generate the first stream data, and encodes the transparency data included in the RGBA data to generate the second stream data.

In some embodiments, after obtaining the RGBA data corresponding to the first image in the picture file, the picture file processing apparatus separates the RGBA data, so as to obtain the RGB data and the transparency data of the first image. The RGB data is color data included in the RGBA data, and the transparency data is transparency data included in the RGBA data. Further, the RGB data and the transparency data are respectively encoded. For a specific encoding process, refer to specific introduction in embodiments shown in FIG. 1 to FIG. 4D. Details are not described herein again.

705. Encapsulate the first stream data and the second stream data to a stream data segment indicated by frame header information corresponding to the first image.

Specifically, the picture file processing apparatus encapsulates the first stream data and the second stream data to the stream data segment indicated by the frame header information corresponding to the first image.

It should be noted that, for the picture header information and the frame header information in this embodiment, refer to exemplary description in FIG. 5A, FIG. 5B, FIG. 5C, FIG. 6A, FIG. 6B, FIG. 7A, FIG. 7B, FIG. 8A, FIG. 8B, and FIG. 8C. Details are not described herein again.

It should be further noted that, in this embodiment, the RGBA data input before encoding may be obtained by decoding picture files of various formats, where a format of a picture file may be any one of formats such as JPEG, BMP, PNG, APNG, and GIF. In this embodiment, the format of the picture file before encoding is not limited.

In this embodiment, the picture file processing apparatus generates the picture header information and the frame header information that correspond to the picture file, and can cause the decoding apparatus to determine, by using the image feature information that is about whether the picture file has the transparency data and that is included in the picture header information, how to obtain stream data and whether the obtained stream data includes the second stream data generated from the transparency data; and can cause the decoding apparatus to obtain the stream data in the stream data segment by using the stream data segment of the picture file indicated by the frame header information, thereby decoding the stream data.

Figure 13:
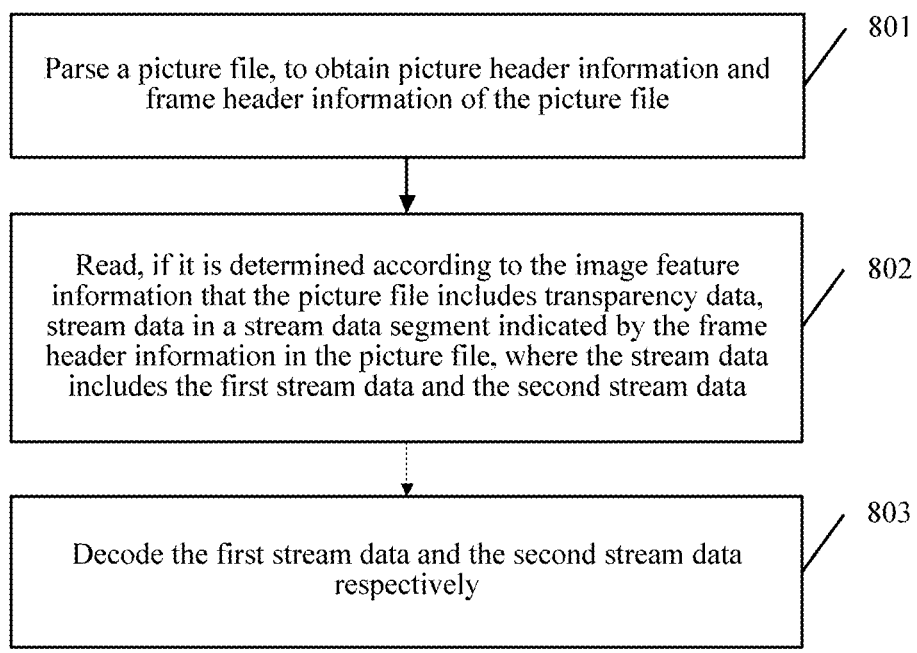
FIG. 13 is a schematic flowchart of another picture file processing method according to an embodiment.

FIG. 13 is a schematic flowchart of another picture file processing method according to an embodiment. The method is performed by a picture file processing apparatus, and the foregoing picture file processing apparatus may be a terminal device or a server. As shown in FIG. 13, the method according to this embodiment may include step 801 to step 803.

801. Parse a picture file, to obtain picture header information and frame header information of the picture file.

Specifically, the picture file processing apparatus parses the picture file, to obtain the picture header information and the frame header information of the picture file. The picture header information includes image feature information about whether the picture file has the transparency data, and it may be determined, by determining whether the picture file includes the transparency data, how to obtain stream data and whether the obtained stream data includes the second stream data generated from the transparency data. The frame header information is used to indicate the stream data segment of the picture file, and the stream data segment from which the stream data may be obtained may be determined by using the frame header information, thereby decoding the stream data. For example, the frame header information includes a frame header information start code, and the stream data segment may be determined by identifying the frame header information start code.

In some embodiments, the parsing, by the picture file processing apparatus, the picture file, to obtain the picture header information of the picture file may be specifically:

reading the picture header information of the picture file from a picture header information data segment of the picture file. The picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the picture header information may further include a user customized information data segment, and the user customized information data segment includes identifier information corresponding to the user customized information, a length of the user customized information, and user customized information; and the user customized information includes EXIF information, for example, an aperture, a shutter, white balance, ISO, a focal length, a date, a time, and the like during photographing, a photographing condition, a camera brand, a model, color encoding, sound recorded during photographing, global positioning system data, a thumbnail, and the like.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format. In some embodiments, the image feature information may further include a YUV color space format used for the picture file.

In some embodiments, the parsing, by the picture file processing apparatus, the picture file, to obtain the frame header information of the picture file may be specifically: reading the frame header information of the picture file from a frame header information data segment of the picture file. The frame header information includes a frame header information start code and delay time information that is used to indicate whether the picture file is a picture file of a dynamic format. In some embodiments, the frame header information further includes at least one of a frame header information data segment length and a stream data segment length of the stream data segment indicated by the frame header information. Further, in some embodiments, the frame header information further includes specific information for distinguishing from another frame of image, for example, encoding area information, transparency information, and a color table. In this embodiment, this is not limited.

It should be noted that, for the picture header information and the frame header information in this embodiment, refer to exemplary description in FIG. 5A, FIG. 5B, FIG. 5C, FIG. 6A, FIG. 6B, FIG. 7A, FIG. 7B, FIG. 8A, FIG. 8B, and FIG. 8C. Details are not described herein again.

802. Read, if it is determined according to the image feature information that the picture file includes transparency data, stream data in a stream data segment indicated by the frame header information in the picture file, where the stream data includes first stream data and second stream data.

Specifically, if it is determined according to the image feature information that the picture file includes transparency data, the picture file processing apparatus reads the stream data in the stream data segment indicated by the frame header information in the picture file. The stream data includes first stream data and second stream data.

In a feasible solution, one frame of image of the picture file corresponds to one piece of frame header information, that is, the frame header information may be used to indicate the stream data segment including the first stream data and the second stream data. Specifically, when the picture file is the picture file of the static format, the picture file of the static format includes a frame of image, that is, the first image, and therefore, the picture file of the static format includes one piece of frame header information. When the picture file is the picture file of the dynamic format, the picture file of the dynamic format usually includes at least two frames of images, and one piece of frame header information is added to each frame of image of the at least two frames of images. If it is determined that the picture file includes the transparency data, the picture file processing apparatus reads the first stream data and the second stream data according to the stream data segment indicated by the frame header information.

In another feasible solution, one piece of stream data in one frame of image of the picture file corresponds to one piece of frame header information, that is, a stream data segment indicated by one piece of frame header information includes one piece of stream data. Specifically, in a case of the picture file of the static format, the picture file of the static format includes one frame of image, that is, the first image, and the first image including the transparency data corresponds to two pieces of stream data that are respectively the first stream data and the second stream data. Therefore, the first stream data in the picture file of the static format corresponds to one piece of frame header information, and the second stream data corresponds to the other piece of frame header information. In a case of the picture file of the dynamic format, the picture file of the dynamic format includes at least two frames of images, each frame of image including the transparency data corresponds to two pieces of stream data that are respectively first stream information and second stream information, and one piece of frame header information is added to each of the first stream information and the second stream information of each frame of image. Therefore, if it is determined that the picture file includes the transparency data, the picture file processing apparatus respectively obtains the first stream data and the second stream data according to two stream data segments respectively indicated by two pieces of frame header information.

It should be noted that, when one piece of stream data in one frame of image of the picture file corresponds to one piece of frame header information, the encoding apparatus may arrange the frame header information data segment corresponding to the first stream data, the first stream data segment, the frame header information data segment corresponding to the second stream data, and the second stream data segment according to a preset order, and the picture file processing apparatus may determine an arrangement order of the encoding apparatus. For example, the first stream data segment, the second stream data segment, and frame header information data segments corresponding to pieces of stream data of one frame of image may be arranged according to the frame header information data segment corresponding to the first stream data, the first stream data segment, the frame header information data segment corresponding to the second stream data, and the second stream data segment. In this way, in a decoding process, the picture file processing apparatus can determine, in stream data segments indicated by two pieces of frame header information and two frame headers indicating the frame of image, a stream data segment from which the first stream data may be obtained, and a stream data segment from which the second stream data may be obtained. It may be understood that, herein, the first stream data is generated from the RGB data, and the second stream data is generated from the transparency data.

803. Decode the first stream data and the second stream data respectively.

Specifically, after the picture file processing apparatus obtains the first stream data and the second stream data from the stream data segment, the picture file processing apparatus decodes the first stream data and the second stream data.

It should be noted that, the picture file processing apparatus may decode the first stream data and the second stream data with reference to an execution process of the decoding apparatus in embodiments shown in FIG. 9 to FIG. 11. Details are not described herein again.

In this embodiment, the picture file processing apparatus parses the picture file to obtain the picture header information and the frame header information, and can determine, by using the image feature information that is about whether the picture file has the transparency data and that is included in the picture header information, how to obtain stream data and whether the obtained stream data includes the second stream data generated from the transparency data; and obtains the stream data in the stream data segment by using the stream data segment of the picture file indicated by the frame header information, thereby decoding the stream data.

Figure 14:
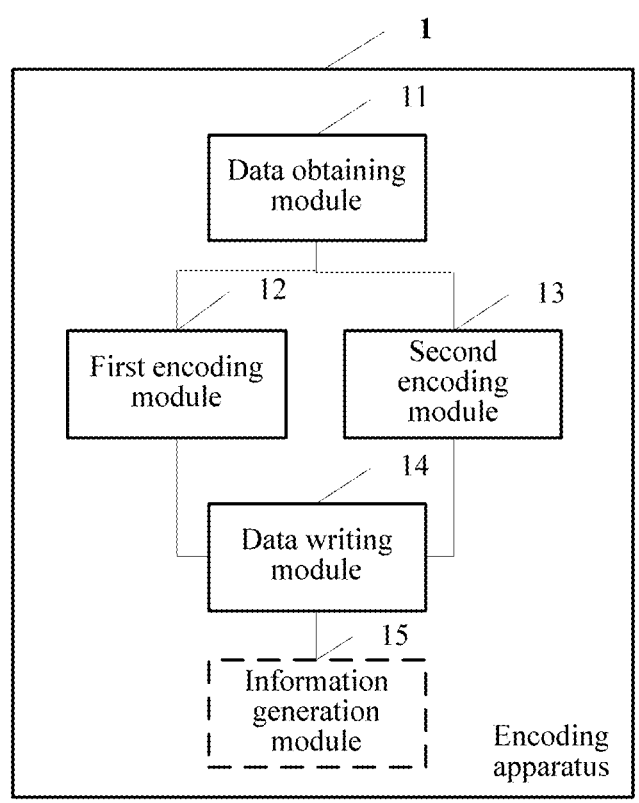
FIG. 14 is a schematic structural diagram of an encoding apparatus according to an embodiment.

FIG. 14 is a schematic structural diagram of an encoding apparatus according to an embodiment. As shown in FIG. 14, the encoding apparatus 1 according to this embodiment may include: a data obtaining module 11, a first encoding module 12, a second encoding module 13, and a data writing module 14. In some embodiments, the encoding apparatus 1 may further include an information generation module 15.

The data obtaining module 11 is configured to obtain RGBA data corresponding to a first image in a picture file, and separate the RGBA data, so as to obtain RGB data and transparency data of the first image, where the RGB data is color data included in the RGBA data, and the transparency data is transparency data included in the RGBA data.

The first encoding module 12 is configured to encode the RGB data of the first image according to a first video encoding mode, to generate first stream data.

The second encoding module 13 is configured to encode the transparency data of the first image according to a second video encoding mode, to generate second stream data.

The data writing module 14 is configured to encapsulate the first stream data and the second stream data to a stream data segment of the picture file, where the first image is an image included in the picture file.

In some embodiments, the first encoding module 12 includes a first data conversion unit and a first stream generation unit, where the first data conversion unit is configured to convert the RGB data of the first image into first YUV data; and the first stream generation unit is configured to encode the first YUV data according to the first video encoding mode, to generate the first stream data.

In some embodiments, the second encoding module 13 includes a second data conversion unit and a second stream generation unit, where the second data conversion unit is configured to convert the transparency data of the first image into second YUV data; and the second stream generation unit is configured to encode the second YUV data according to the second video encoding mode, to generate the second stream data.

In some embodiments, the second data conversion unit is specifically configured to set the transparency data of the first image to a Y component in the second YUV data, and skip setting UV components in the second YUV data. Alternatively, the second data conversion unit is specifically configured to set the transparency data of the first image to a Y component in the second YUV data, and set UV components in the second YUV data to preset data.

In some embodiments, the data obtaining module 11 is configured to obtain, if the picture file is a picture file of a dynamic format and the first image is an image corresponding to a $k^{th}$ frame in the picture file, RGBA data corresponding to a second image corresponding to a $(k+1)^{th}$ frame in the picture file, and separate the RGBA data, so as to obtain RGB data and transparency data of the second image;

the first encoding module 12 is further configured to encode the RGB data of the second image according to a third video encoding mode, to generate third stream data;

the second encoding module 13 is further configured to encode the transparency data of the second image according to a fourth video encoding mode, to generate fourth stream data; and the data writing module 14 is further configured to encapsulate the third stream data and the fourth stream data to a stream data segment of the picture file.

In some embodiments, the encoding apparatus 1 further includes:

an information generation module 15, configured to generate picture header information and frame header information that correspond to the picture file, the picture header information including image feature information about whether the picture file has transparency data, and the frame header information being used to indicate a stream data segment of the picture file.

In some embodiments, the data writing module 13 is further configured to writing the picture header information generated by the information generation module 15 to a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, the data writing module 13 is further configured to writing the frame header information generated by the information generation module 15 to a frame header information data segment of the picture file, where the frame header information includes a frame header information start code and delay time information that is used to indicate whether the picture file is a picture file of a dynamic format.

It should be noted that, modules and units executed by and a beneficial effect brought by the encoding apparatus 1 described in this embodiment may be specifically implemented according to methods in method embodiments shown in FIG. 1 to FIG. 8. Details are not described herein again.

Figure 15:
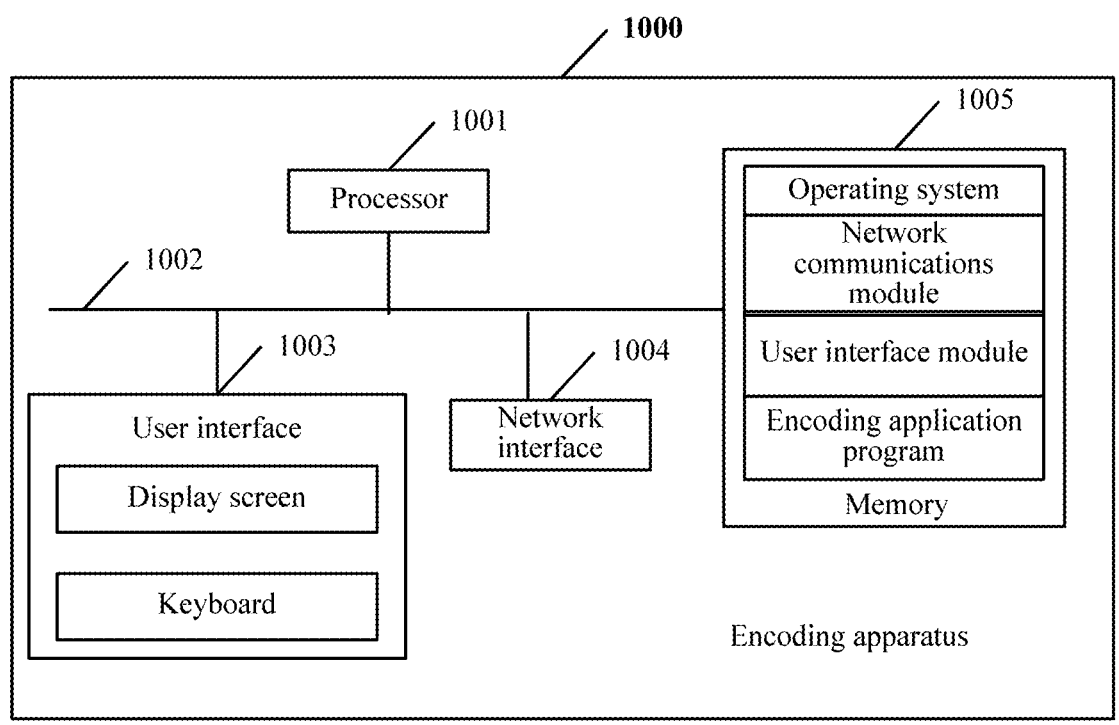
FIG. 15 is a schematic structural diagram of another encoding apparatus according to an embodiment.

FIG. 15 is a schematic structural diagram of another encoding apparatus according to an embodiment. As shown in FIG. 15, the encoding apparatus 1000 may include: at least one processor 1001, for example, CPU, at least one network interface 1004, a memory 1005, and at least one communications bus 1002. The network interface 1004 may include a standard wired interface and a standard wireless interface (such as a Wi-Fi interface). The memory 1005 may be a high-speed RAM memory, or may be a non-volatile memory, for example, at least one magnetic disk memory. In some embodiments, the memory 1005 may further be at least one storage apparatus that is located far away from the processor 1001. The communications bus 1002 is configured to implement connection and communication between the components. In some embodiments, the encoding apparatus 1000 includes a user interface 1003, where the user interface 1003 may include a display screen and a keyboard. As shown in FIG. 15, the memory 1005, which is used as a computer storage medium, may include an operating system, a network communications module, a user interface module, and an encoding application program.

In the encoding apparatus 1000 shown in FIG. 15, the processor 1001 may be configured to invoke the encoding application program stored in the memory 1005, and specifically perform the following operations:

obtaining RGBA data corresponding to a first image in a picture file, and separating the RGBA data, so as to obtain RGB data and transparency data of the first image, where the RGB data is color data included in the RGBA data, and the transparency data is transparency data included in the RGBA data;

encoding the RGB data of the first image according to a first video encoding mode, to generate first stream data;

encoding the transparency data of the first image according to a second video encoding mode, to generate second stream data; and writing the first stream data and the second stream data to a stream data segment of the picture file.

In some embodiments, during the encoding the RGB data of the first image according to a first video encoding mode, to generate first stream data, the processor 1001 specifically performs:

converting the RGB data of the first image into first YUV data; and encoding the first YUV data according to the first video encoding mode, to generate the first stream data.

In some embodiments, during the encoding the transparency data of the first image according to a second video encoding mode, to generate second stream data, the processor 1001 specifically performs:

converting the transparency data of the first image into second YUV data; and encoding the second YUV data according to the second video encoding mode, to generate the second stream data.

In some embodiments, during the converting the transparency data of the first image into second YUV data, the processor 1001 specifically performs:

setting the transparency data of the first image to a Y component in the second YUV data, and skipping setting UV components in the second YUV data; or setting the transparency data of the first image to a Y component in the second YUV data, and setting UV components in the second YUV data to preset data.

In some embodiments, the processor 1001 further performs the following steps:

obtaining, if the picture file is a picture file of a dynamic format and the first image is an image corresponding to a $k^{th}$ frame in the picture file, RGBA data corresponding to a second image corresponding to a $(k+1)^{th}$ frame in the picture file, and separating the RGBA data, so as to obtain RGB data and transparency data of the second image;

encoding the RGB data of the second image according to the third video encoding mode, to generate the third stream data;

encoding the transparency data of the second image according to a fourth video encoding mode, to generate fourth stream data; and writing the third stream data and the fourth stream data to a stream data segment of the picture file.

In some embodiments, the processor 1001 further performs the following step:

generating picture header information and frame header information that correspond to the picture file, the picture header information including image feature information about whether the picture file has transparency data, and the frame header information being used to indicate a stream data segment of the picture file.

In some embodiments, the processor 1001 further performs the following step:

writing the picture header information to a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, the processor 1001 further performs the following step:

writing the frame header information to a frame header information data segment of the picture file, where the frame header information includes a frame header information start code and delay time information that is used to indicate whether the picture file is a picture file of a dynamic format.

It should be noted that, steps performed by and a beneficial effect brought by the processor 1001 described in this embodiment may be specifically implemented according to methods in method embodiments shown in FIG. 1 to FIG. 8. Details are not described herein again.

Figure 16:
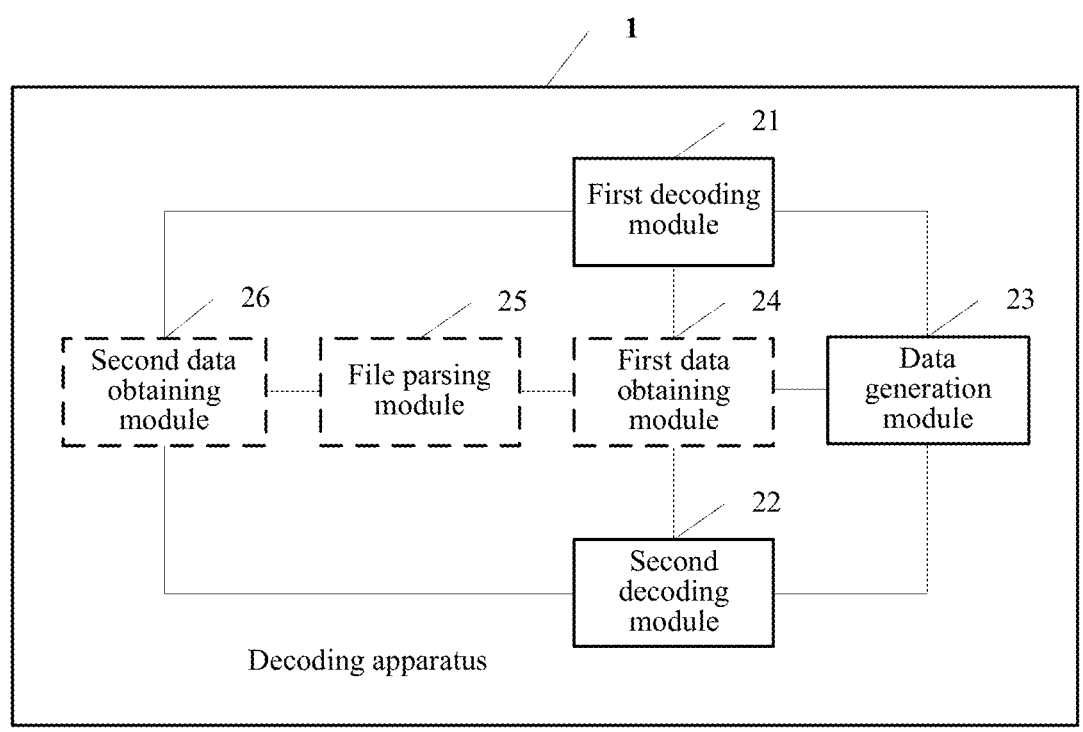
FIG. 16 is a schematic structural diagram of a decoding apparatus according to an embodiment.

FIG. 16 is a schematic structural diagram of a decoding apparatus according to an embodiment. As shown in FIG. 16, the decoding apparatus 2 according to this embodiment may include: a first decoding module 21, a second decoding module 22, and a data generation module 23. In some embodiments, the decoding apparatus 2 may further include at least one of a first data obtaining module 24, a file parsing module 25, and a second data obtaining module 26. In this embodiment, the first stream data and the second stream data are data that is generated from the first image and that is read from a stream data segment of a picture file.

The first decoding module 21 is configured to decode first stream data according to a first video decoding mode, to generate RGB data of the first image.

The second decoding module 22 is configured to decode second stream data according to a second video decoding mode, to generate transparency data of the first image.

The data generation module 23 is configured to generate RGBA data corresponding to the first image according to the RGB data and the transparency data of the first image.

In some embodiments, the first decoding module 21 includes a first data generation unit and a first data conversion unit, where the first data generation unit is configured to decode the first stream data according to the first video decoding mode, to generate first YUV data of the first image; and the first data conversion unit is configured to convert the first YUV data into the RGB data of the first image.

In some embodiments, the second decoding module 22 includes a second data generation unit and a second data conversion unit, where the second data generation unit is configured to decode the second stream data according to the second video decoding mode, to generate second YUV data of the first image; and the second data conversion unit is configured to convert the second YUV data into the transparency data of the first image.

In some embodiments, the second data conversion unit is specifically configured to set a Y component in the second YUV data to the transparency data of the first image, and discard UV components in the second YUV data.

In some embodiments, the decoding apparatus 2 further includes:

a first data obtaining module 24, configured to obtain, if the picture file is a picture file of a dynamic format and the first image is an image corresponding to a $k^{th}$ frame in the picture file of the dynamic format, from a stream data segment of the picture file, third stream data and fourth stream data that are generated from a second image corresponding to a $(k+1)^{th}$ frame in the picture file;

the first decoding module 21 is further configured to decode the third stream data according to a third video decoding mode, to generate RGB data of the second image;

the second decoding module 22 is further configured to decode the fourth stream data according to a fourth video decoding mode, to generate transparency data of the second image; and the data generation module 23 is further configured to generate RGBA data corresponding to the second image according to the RGB data and the transparency data of the second image.

In some embodiments, the decoding apparatus 2 further includes a file parsing module 25, where the file parsing module 25 is configured to parse a picture file, to obtain picture header information and frame header information of the picture file, the picture header information including image feature information about whether the picture file has transparency data, and the frame header information being used to indicate a stream data segment of the picture file.

In some embodiments, in the aspect of parsing a picture file, to obtain picture header information of the picture file, the file parsing module 25 is specifically configured to read the picture header information of the picture file from a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, in the aspect of parsing a picture file, to obtain frame header information of the picture file, the file parsing module 25 is specifically configured to read the frame header information of the picture file from a frame header information data segment of the picture file, where the frame header information includes a frame header information start code and delay time information that is used to indicate whether the picture file is a picture file of a dynamic format.

In some embodiments, the decoding apparatus 2 further includes:

a second data obtaining module 26, configured to read, if it is determined according to the image feature information that the picture file includes transparency data, stream data in a stream data segment indicated by the frame header information in the picture file, where the stream data includes first stream data and second stream data.

It should be noted that, modules and units executed by and a beneficial effect brought by the decoding apparatus 2 described in this embodiment may be specifically implemented according to methods in method embodiments shown in FIG. 9 to FIG. 11. Details are not described herein again.

Figure 17:
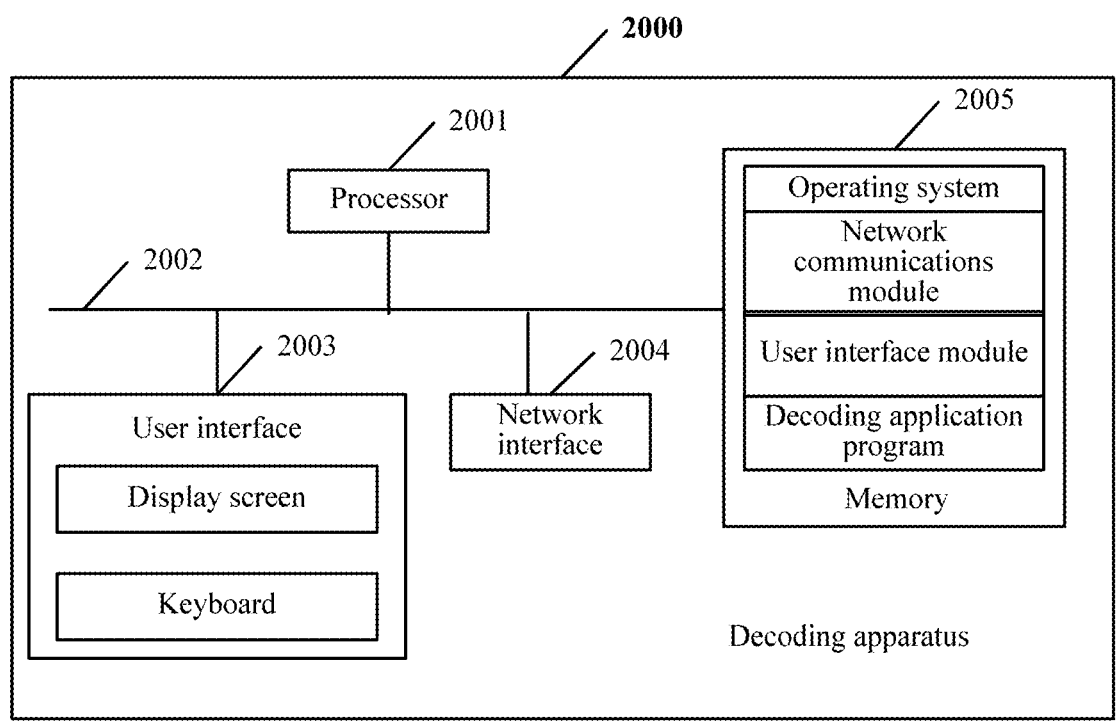
FIG. 17 is a schematic structural diagram of another decoding apparatus according to an embodiment.

FIG. 17 is a schematic structural diagram of another decoding apparatus according to an embodiment. As shown in FIG. 17, the decoding apparatus 2000 may include: at least one processor 2001, for example, CPU, at least one network interface 2004, a memory 2005, and at least one communications bus 2002. The network interface 2004 may include a standard wired interface and a standard wireless interface (such as a Wi-Fi interface). The memory 2005 may be a high-speed RAM memory, or may be a non-volatile memory, for example, at least one magnetic disk memory. The memory 2005 may further be at least one storage apparatus that is located far away from the processor 2001. The communications bus 2002 is configured to implement connection and communication between the components. In some embodiments, the decoding apparatus 2000 includes a user interface 2003, where the user interface 2003 may include a display screen and a keyboard. As shown in FIG. 17, the memory 2005, which is used as a computer storage medium, may include an operating system, a network communications module, a user interface module, and a decoding application program.

In the decoding apparatus 2000 shown in FIG. 17, the processor 2001 may be configured to invoke the decoding application program stored in the memory 2005, and specifically perform the following operations:

decoding first stream data according to a first video decoding mode, to generate RGB data of a first image;

decoding second stream data according to a second video decoding mode, to generate transparency data of the first image; and generating RGBA data corresponding to the first image according to the RGB data and the transparency data of the first image, where the first stream data and the second stream data are data that is generated from the first image and that is read from a stream data segment of a picture file.

In some embodiments, during the decoding first stream data according to a first video decoding mode, to generate RGB data of a first image, the processor 2001 specifically performs:

decoding the first stream data according to the first video decoding mode, to generate first YUV data of the first image; and converting the first YUV data into the RGB data of the first image.

In some embodiments, during the decoding second stream data according to a second video decoding mode, to generate transparency data of the first image, the processor 2001 specifically performs:

decoding the second stream data according to the second video decoding mode, to generate second YUV data of the first image; and converting the second YUV data into the transparency data of the first image.

In some embodiments, during the converting the second YUV data into the transparency data of the first image, the processor 2001 specifically performs:

setting a Y component in the second YUV data to the transparency data of the first image, and discarding UV components in the second YUV data.

In some embodiments, the processor 2001 further performs the following steps:

obtaining, if the picture file is a picture file of a dynamic format and the first image is an image corresponding to a $k^{th}$ frame in the picture file of the dynamic format, from a stream data segment of the picture file, third stream data and fourth stream data that are generated from a second image corresponding to a $(k+1)^{th}$ frame in the picture file;

decoding the third stream data according to a third video decoding mode, to generate RGB data of the second image;

decoding the fourth stream data according to a fourth video decoding mode, to generate transparency data of the second image; and generating RGBA data corresponding to the second image according to the RGB data and the transparency data of the second image.

In some embodiments, before the decoding first stream data according to a first video decoding mode, to generate RGB data of a first image, the processor 2001 further performs the following step:

parsing the picture file, to obtain picture header information and frame header information of the picture file, the picture header information including image feature information about whether the picture file has transparency data, and the frame header information being used to indicate a stream data segment of the picture file.

In some embodiments, during the parsing the picture file, to obtain the picture header information of the picture file, the processor 2001 specifically performs:

reading the picture header information of the picture file from a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, during the parsing the picture file, to obtain the frame header information of the picture file, the processor 2001 specifically performs:

reading the frame header information of the picture file from a frame header information data segment of the picture file, where the frame header information includes a frame header information start code and delay time information that is used to indicate whether the picture file is a picture file of a dynamic format.

In some embodiments, the processor 2001 further performs the following step: reading, if it is determined according to the image feature information that the picture file includes transparency data, stream data in a stream data segment indicated by the frame header information in the picture file, where the stream data includes the first stream data and the second stream data.

It should be noted that, steps performed by and a beneficial effect brought by the processor 2001 described in this embodiment may be specifically implemented according to methods in method embodiments shown in FIG. 9 to FIG. 11. Details are not described herein again.

Figure 18:
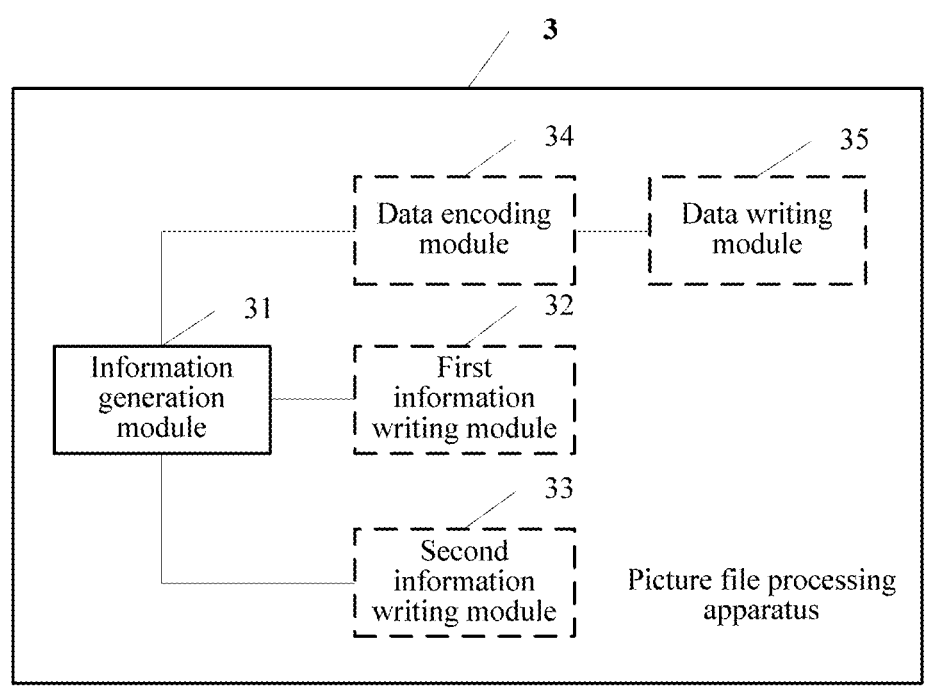
FIG. 18 is a schematic structural diagram of a picture file processing apparatus according to an embodiment.

FIG. 18 is a schematic structural diagram of a picture file processing apparatus according to an embodiment. As shown in FIG. 18, the picture file processing apparatus 3 according to this embodiment may include: an information generation module 31. In some embodiments, the picture file processing apparatus 3 may further include at least one of a first information writing module 32, a second information writing module 33, a data encoding module 34, and a data writing module 35.

The information generation module 31 is configured to generate picture header information and frame header information that correspond to a picture file, the picture header information including image feature information about whether the picture file has transparency data, and the frame header information being used to indicate a stream data segment of the picture file.

In some embodiments, the picture file processing apparatus 3 further includes:

a first information writing module 32, configured to encapsulate the picture header information to a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

Further, in some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

The picture file processing apparatus 3 further includes a second information writing module 33, where the second information writing module 33 is configured to encapsulate the frame header information to a frame header information data segment of the picture file, where a first image is an image included in the picture file, where the frame header information includes a frame header information start code and delay time information that is used to indicate whether the picture file is a picture file of a dynamic format.

The picture file processing apparatus 3 further includes a data encoding module 34 and a data writing module 35, where the data encoding module 34 encodes, if it is determined that the image feature information includes transparency data, RGB data included in RGBA data corresponding to the first image to generate first stream data, and encodes transparency data included in the RGBA data to generate second stream data; and the data writing module 35 encapsulates the first stream data and the second stream data to a stream data segment indicated by frame header information corresponding to the first image.

It should be noted that, modules executed by and a beneficial effect brought by the picture file processing apparatus 3 described in this embodiment may be specifically implemented according to the method in the method embodiment shown in FIG. 12. Details are not described herein again.

Figure 19:
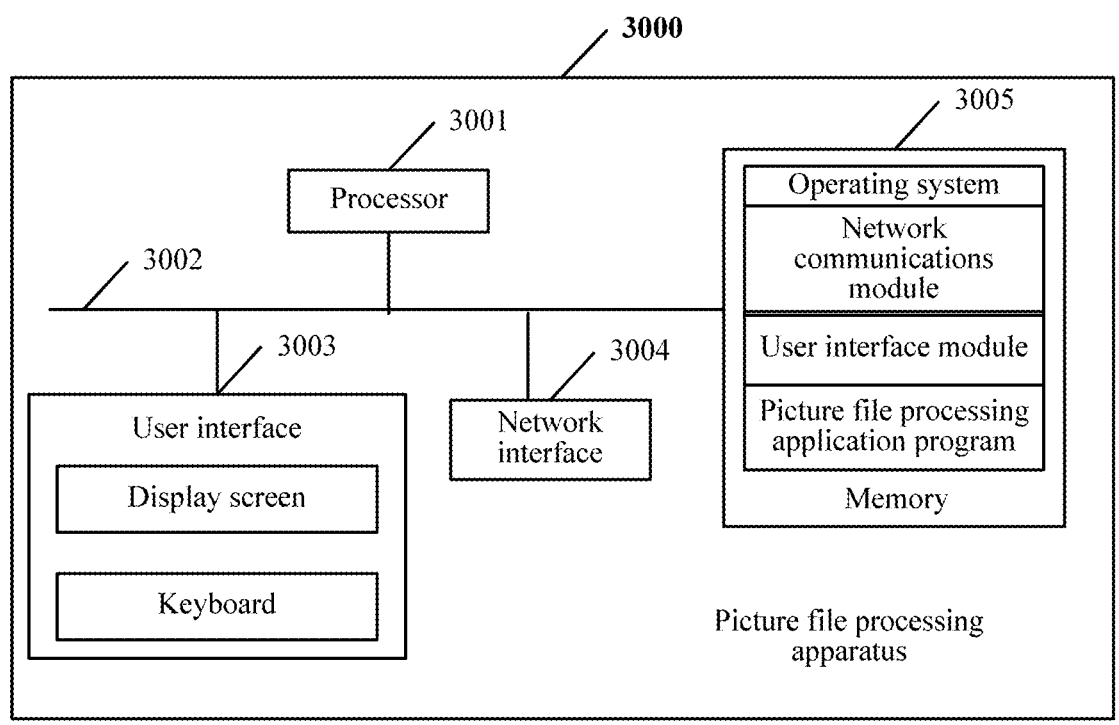
FIG. 19 is a schematic structural diagram of another picture file processing apparatus according to an embodiment.

FIG. 19 is a schematic structural diagram of another picture file processing apparatus according to an embodiment. As shown in FIG. 19, the picture file processing apparatus 3000 may include: at least one processor 3001, for example, CPU, at least one network interface 3004, a memory 3005, and at least one communications bus 3002. The network interface 3004 may include a standard wired interface and a standard wireless interface (such as a Wi-Fi interface). The memory 3005 may be a high-speed RAM memory, or may be a non-volatile memory, for example, at least one magnetic disk memory. The memory 3005 may further be at least one storage apparatus that is located far away from the processor 3001. The communications bus 3002 is configured to implement connection and communication between the components.

In some embodiments, the picture file processing apparatus 3000 includes a user interface 3003, where the user interface 3003 may include a display screen and a keyboard. As shown in FIG. 19, the memory 3005, which is used as a computer storage medium, may include an operating system, a network communications module, a user interface module, and a picture file processing application program.

In the picture file processing apparatus 3000 shown in FIG. 19, the processor 3001 may be configured to invoke the picture file processing application program stored in the memory 3005, and specifically perform the following operation:

generating picture header information and frame header information that correspond to a picture file, the picture header information including image feature information about whether the picture file has transparency data, and the frame header information being used to indicate a stream data segment of the picture file.

In some embodiments, the processor 3001 further performs the following step:

writing the picture header information to a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, the processor 3001 further performs the following step:

writing the frame header information to a frame header information data segment of the picture file, where a first image is an image included in the picture file; and the frame header information includes a frame header information start code and delay time information that is used to indicate whether the picture file is a picture file of a dynamic format.

In some embodiments, the processor 3001 further performs the following steps:

encoding, if it is determined that the image feature information includes transparency data, RGB data included in RGBA data corresponding to the first image to generate first stream data, and encoding transparency data included in the RGBA data to generate second stream data; and writing the first stream data and the second stream data to a stream data segment indicated by frame header information corresponding to the first image.

It should be noted that, steps performed by and a beneficial effect brought by the processor 3001 described in this embodiment may be specifically implemented according to the method in the method embodiment shown in FIG. 12. Details are not described herein again.

Figure 20:
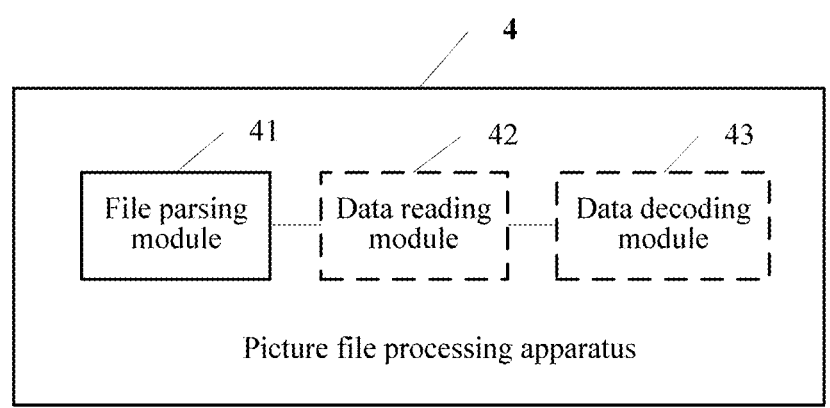
FIG. 20 is a schematic structural diagram of another picture file processing apparatus according to an embodiment.

FIG. 20 is a schematic structural diagram of a picture file processing apparatus according to an embodiment. As shown in FIG. 20, the picture file processing apparatus 4 according to this embodiment may include: a file parsing module 41. In some embodiments, the picture file processing apparatus 4 may further include at least one of a data reading module 42 and a data decoding module 43.

The file parsing module 42 is configured to parse a picture file, to obtain picture header information and frame header information of the picture file, the picture header information including image feature information about whether the picture file has transparency data, and the frame header information being used to indicate a stream data segment of the picture file.

In some embodiments, in the aspect of parsing a picture file, to obtain picture header information of the picture file, the file parsing module 42 is specifically configured to read the picture header information of the picture file from a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, in the aspect of parsing a picture file, to obtain frame header information of the picture file, the file parsing module 41 is specifically configured to read the frame header information of the picture file from a frame header information data segment of the picture file, where the frame header information includes a frame header information start code and delay time information that is used to indicate whether the picture file is a picture file of a dynamic format.

In some embodiments, the picture file processing apparatus 4 further includes a data reading module 42 and a data decoding module 43, where the data reading module 42 is configured to read, if it is determined according to the image feature information that the picture file includes transparency data, stream data in a stream data segment indicated by the frame header information in the picture file, where the stream data includes first stream data and second stream data; and the data decoding module 43 is configured to decode the first stream data and the second stream data respectively.

It should be noted that, modules executed by and a beneficial effect brought by the picture file processing apparatus 4 described in this embodiment may be specifically implemented according to the method in the method embodiment shown in FIG. 12. Details are not described herein again.

Figure 21:
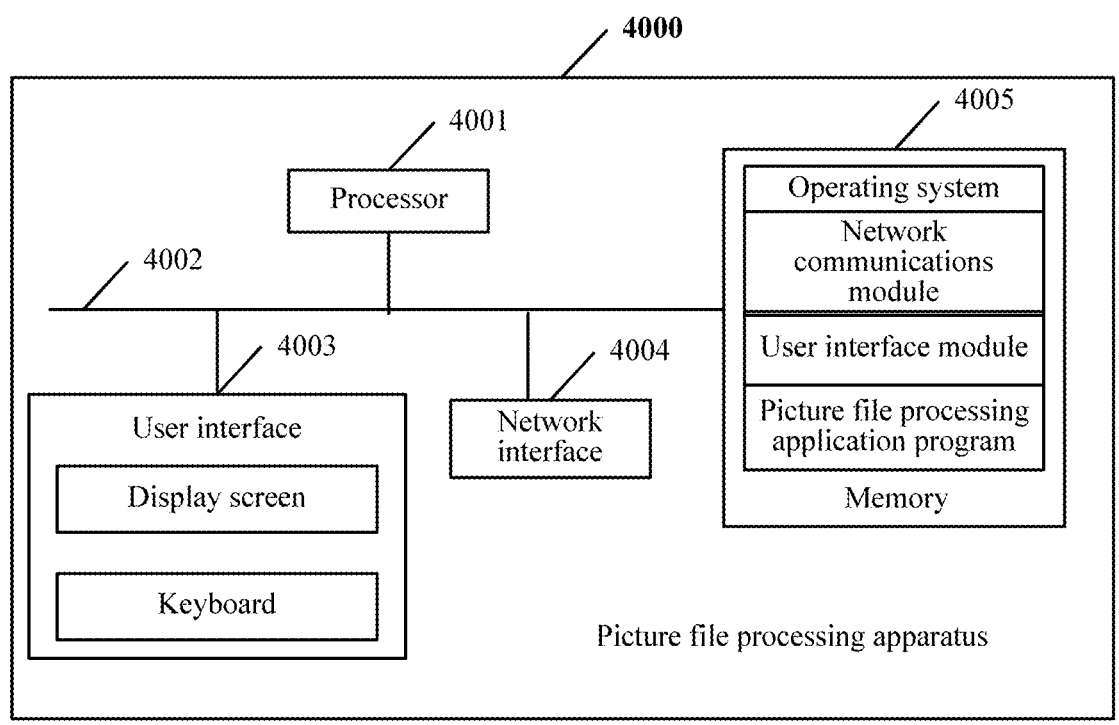
FIG. 21 is a schematic structural diagram of another picture file processing apparatus according to an embodiment.

FIG. 21 is a schematic structural diagram of another picture file processing apparatus according to an embodiment. As shown in FIG. 21, the picture file processing apparatus 4000 may include: at least one processor 4001, for example, CPU, at least one network interface 4004, a memory 4005, and at least one communications bus 4002. The network interface 4004 may include a standard wired interface and a standard wireless interface (such as a Wi-Fi interface). The memory 4005 may be a high-speed RAM memory, or may be a non-volatile memory, for example, at least one magnetic disk memory. The memory 4005 may further be at least one storage apparatus that is located far away from the processor 4001. The communications bus 4002 is configured to implement connection and communication between the components. In some embodiments, the picture file processing apparatus 4000 includes a user interface 4003, where the user interface 4003 may include a display screen and a keyboard. As shown in FIG. 21, the memory 4005, which is used as a computer storage medium, may include an operating system, a network communications module, a user interface module, and a picture file processing application program.

In the picture file processing apparatus 4000 shown in FIG. 21, the processor 4001 may be configured to invoke the picture file processing application program stored in the memory 4005, and specifically perform the following operation:

parsing the picture file, to obtain picture header information and frame header information of the picture file, the picture header information including image feature information about whether the picture file has transparency data, and the frame header information being used to indicate a stream data segment of the picture file.

In some embodiments, during the parsing the picture file, to obtain the picture header information of the picture file, the processor 4001 specifically performs:

reading the picture header information of the picture file from a picture header information data segment of the picture file, where the picture header information includes an image file identifier, a decoder identifier, a version number, and the image feature information; the image file identifier is used to indicate a type of the picture file, and the decoder identifier is used to indicate an identifier of an encoding/decoding standard used for the picture file; and the version number is used to indicate a profile of the encoding/decoding standard used for the picture file.

In some embodiments, the image feature information further includes an image feature information start code, an image feature information data segment length, a first identifier used to indicate whether the picture file is a picture file of a static format, a second identifier used to indicate whether the picture file is a picture file of a dynamic format, a third identifier used to indicate whether the picture file is losslessly encoded, a YUV color space value domain used for the picture file, a width of the picture file, a height of the picture file, and a quantity of frames used to indicate whether the picture file is a picture file of the dynamic format.

In some embodiments, during the parsing the picture file, to obtain the frame header information of the picture file, the processor 4001 specifically performs:

reading the frame header information of the picture file from a frame header information data segment of the picture file, where the frame header information includes a frame header information start code and delay time information that is used to indicate whether the picture file is a picture file of a dynamic format.

In some embodiments, the processor 4001 further performs the following steps:

reading, if it is determined according to the image feature information that the picture file includes transparency data, stream data in a stream data segment indicated by the frame header information in the picture file, where the stream data includes the first stream data and the second stream data; and decoding the first stream data and the second stream data respectively.

It should be noted that, steps performed by and a beneficial effect brought by the processor 4001 described in this embodiment may be specifically implemented according to the method in the method embodiment shown in FIG. 13. Details are not described herein again.

Figure 22:
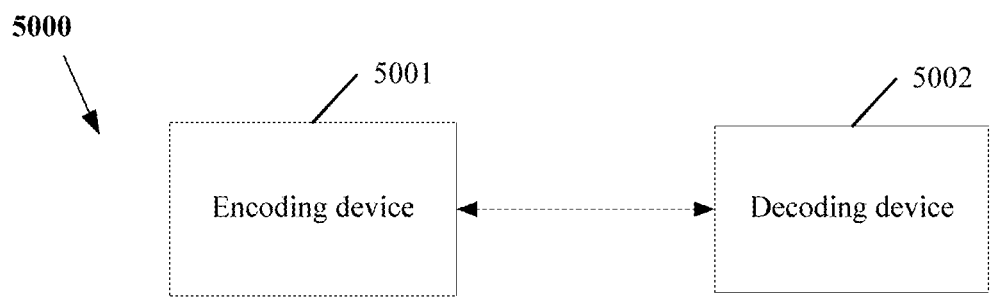
FIG. 22 is a system architecture diagram of a picture file processing system according to an embodiment.

FIG. 22 is a system architecture diagram of a picture file processing system according to an embodiment. As shown in FIG. 22, the picture file processing system 5000 includes an encoding device 5001 and a decoding device 5002.

In a feasible solution, the encoding device 5001 may be the encoding apparatus shown in FIG. 1 to FIG. 8, or may include a terminal device having an encoding module implementing a function of the encoding apparatus shown in FIG. 1 to FIG. 8; and correspondingly, the decoding device 5002 may be the decoding apparatus shown in FIG. 9 to FIG. 11, or may include a terminal device having a decoding module implementing a function of the decoding apparatus shown in FIG. 9 to FIG. 11.

In another feasible solution, the encoding device 5001 may be the picture file processing apparatus shown in FIG. 12, or may include a picture file processing module implementing a function of the picture file processing apparatus shown in FIG. 12; and correspondingly, the decoding device 5002 may be the picture file processing apparatus shown in FIG. 13, or may include a picture file processing module implementing a function of the picture file processing apparatus shown in FIG. 13.

The encoding apparatus, the decoding apparatus, the picture file processing apparatus, and the terminal device involved in this embodiment may include devices such as a tablet computer, a mobile phone, an electronic reader, a personal computer (PC), a notebook computer, an in-vehicle device, a network television, and a wearable device. In this embodiment, this is not limited.

Figure 23:
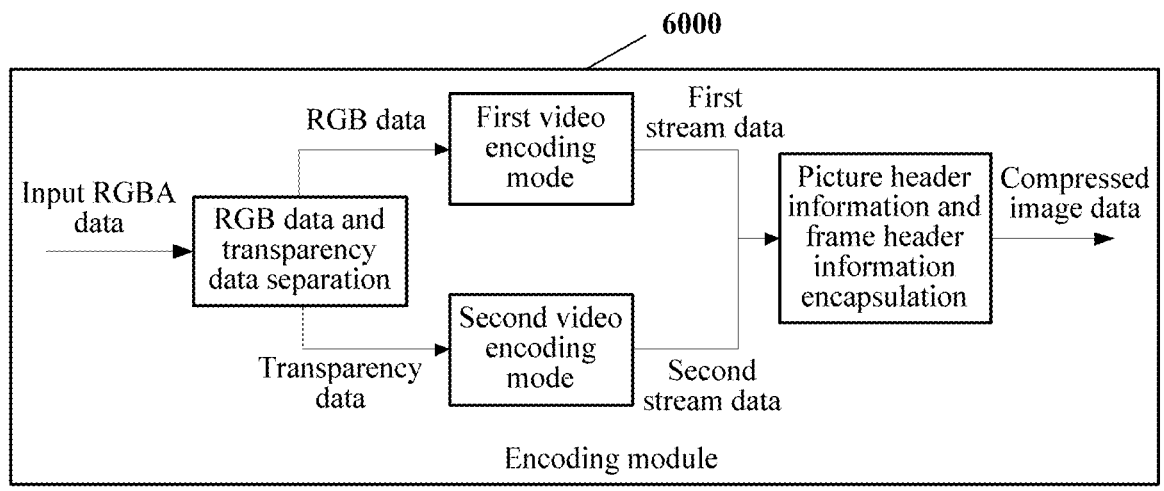
FIG. 23 is a diagram of an example of an encoding module according to an embodiment.
Figure 24:
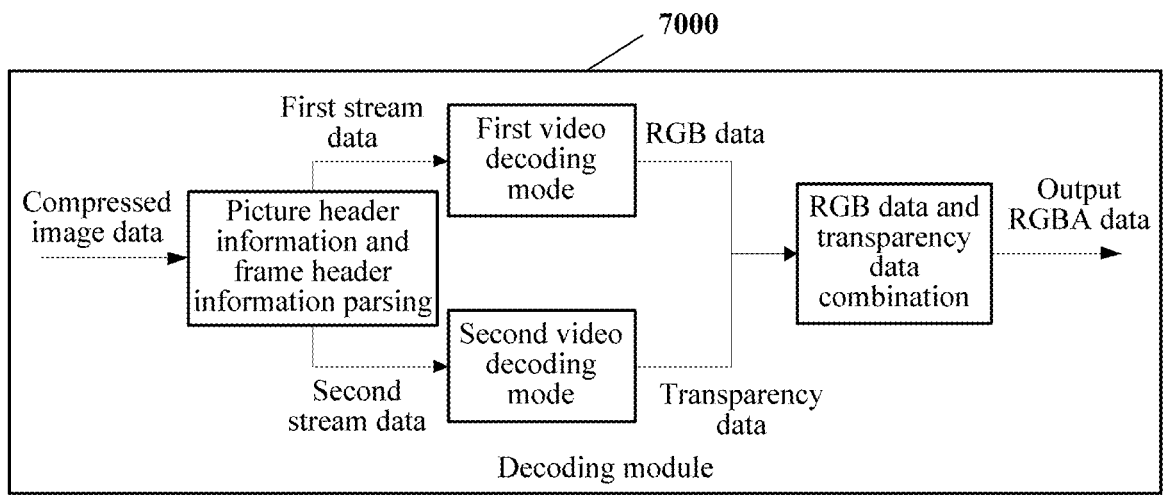
FIG. 24 is a diagram of an example of a decoding module according to an embodiment.

Further, the encoding device 5001 and the decoding device 5002 involved in this embodiment are specifically introduced with reference to FIG. 23 and FIG. 24. From the perspective of functional logic, FIG. 23 and FIG. 24 more completely present other aspects that may be involved in the methods shown above, so as to help a reader further understand technical solutions recorded in this application. FIG. 23 is a diagram of an example of an encoding module according to an embodiment. As shown in FIG. 23, the encoding device 5001 may include an encoding module 6000 shown in FIG. 23, and the encoding module 6000 may include: an RGB data and transparency data separation sub-module, a first video encoding mode sub-module, a second video encoding mode sub-module, and a picture header information and frame header information encapsulation sub-module. The RGB data and transparency data separation sub-module is configured to separate RGBA data of a picture source format into RGB data and transparency data. The first video encoding mode sub-module is configured to encode the RGB data to generate first stream data. The second video encoding mode sub-module is configured to encode the transparency data to generate second stream data. The picture header information and frame header information encapsulation sub-module is configured to encapsulate picture header information, frame header information, and stream data that includes the first stream data and the second stream data to output compressed image data.

During specific implementation, for a picture file of a static format, first, the encoding module 6000 receives the input RGBA data of the picture file, and divides, by using the RGB data and transparency data separation sub-module, the RGBA data into the RGB data and the transparency data; then encodes the RGB data according to a first video encoding mode, to generate the first stream data; then encodes the transparency data according to the second video encoding mode, to generate the second stream data; and then generates the picture header information and the frame header information of the picture file, encapsulates the first stream data, the second stream data, the frame header information, and the picture header information to corresponding data segments, and then generates compressed image data corresponding to the RGBA data. The data segments to which the first stream data, the second stream data, the frame header information, and the picture header information are written may include, as shown in FIG. 7A, a picture header information data segment, an image frame header information data segment corresponding to the first stream data, a first stream data segment, a transparent channel frame header information data segment corresponding to the second stream data, and a second stream data segment.

For a picture file of a dynamic format, first, the encoding module 6000 determines a quantity of included frames; then divides, by using the RGB data and transparency data separation sub-module, RGBA data of each frame into RGB data and transparency data, encodes the RGB data according to a first video encoding mode, to generate first stream data, encodes the transparency data according to the second video encoding mode, to generate the second stream data, generates frame header information corresponding to each frame, and encapsulates the pieces of stream data and the frame header information to corresponding data segments; and finally generates picture header information of the picture file, encapsulates the picture header information to a corresponding data segment, and then generates compressed image data corresponding to the RGBA data. The corresponding data segments to which the pieces of stream data and the frame header information are written include, as shown in FIG. 7B, a picture header information data segment, a plurality of frame header information data segments, and a plurality of stream data segments. The picture file of the dynamic format includes picture header information, a plurality of pieces of frame header information, and stream data that indicates a plurality of frames of images. Each of the first stream data and the second stream data corresponding to one frame of image corresponds to one piece of frame header information.

In some embodiments, the compressed image data may alternatively be described by using a name such as a compressed stream or an image sequence. In this embodiment, this is not limited.

FIG. 24 is a diagram of an example of a decoding module according to an embodiment. As shown in FIG. 24, the decoding device 5002 may include a decoding module 7000 shown in FIG. 24, and the decoding module 7000 may include: a picture header information and frame header information parsing sub-module, a first video decoding mode sub-module, a second video decoding mode sub-module, and an RGB data and transparency data combination sub-module. The picture header information and frame header information parsing sub-module is configured to parse compressed image data of a picture file, so as to determine picture header information and frame header information, where the compressed image data is data obtained after the encoding module shown in FIG. 23 completes encoding. The first video decoding mode sub-module is configured to decode first stream data, where the first stream data is generated from RGB data. The second video decoding mode sub-module is configured to decode second stream data, where the second stream data is generated from transparency data. The RGB data and transparency data combination sub-module is configured to combine the RGB data and the transparency data into RGBA data, so as to output the RGBA data.

During specific implementation, for a picture file of a static format, first, the decoding module 7000 parses compressed image data of the picture file by using the picture header information and frame header information parsing sub-module, to obtain picture header information and frame header information of the picture file, and obtains, if it is determined according to the picture header information that the picture file has transparency data, the first stream data and the second stream data from a stream data segment indicated by the frame header information, where the frame header information includes a frame header information start code, and the stream data segment may be determined by identifying the frame header information start code; then decodes the first stream data according to a first video decoding mode, to generate RGB data; then decodes the second stream data according to a second video decoding mode, to generate transparency data; and finally, combines the RGB data and the transparency data, to generate RGBA data, and outputs the RGBA data.

For a picture file of a dynamic format, first, the decoding module 7000 parses compressed image data of the picture file by using the picture header information and frame header information parsing sub-module, to obtain picture header information and frame header information of the picture file, and determines a quantity of frames included in the picture file; then obtains, if it is determined according to the picture header information that the picture file has transparency data, the first stream data and the second stream data from a stream data segment indicated by the frame header information of each frame of image, where the frame header information includes a frame header information start code, and the stream data segment may be determined by identifying the frame header information start code, decodes first stream data corresponding to each frame of image according to a first video decoding mode, to generate RGB data, and decodes the second stream data corresponding to each frame of image according to the second video decoding mode, to generate the transparency data; and finally combines the RGB data and the transparency data of each frame of image, to generate RGBA data, and outputs RGBA data of all frames included in the compressed image data.

For the picture file processing system shown in FIG. 22, for example, the encoding device 5001 may encode a picture file of a source format according to the encoding module shown in FIG. 23, generate compressed image data, and transmit encoded compressed image data to the decoding device 5002, and after receiving the compressed image data, the decoding device 5002 decodes the compressed image data according to the decoding module shown in FIG. 24, so as to obtain RGBA data corresponding to the picture file. The picture file of the source format may include but is not limited to jpeg, png, gif, or the like.

Figure 25:
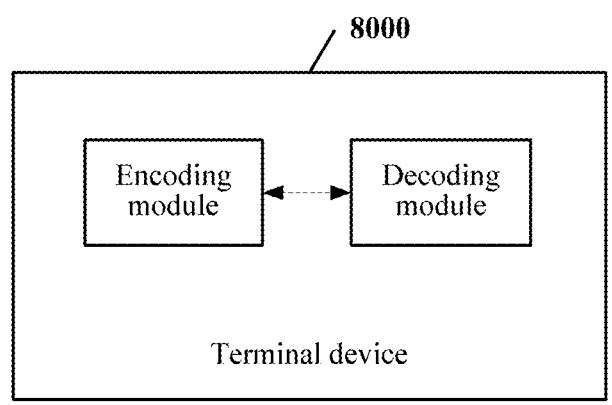
FIG. 25 is a schematic structural diagram of a terminal device according to an embodiment.

FIG. 25 is a schematic structural diagram of a terminal device according to an embodiment. As shown in FIG. 25, the terminal device includes an encoding module and a decoding module. In a feasible solution, the encoding module may be an encoding module implementing a function of the encoding apparatus shown in FIG. 1 to FIG. 8; and correspondingly, the decoding module may be a decoding module implementing a function of the decoding apparatus shown in FIG. 9 to FIG. 11. In a feasible solution, the encoding module may implement encoding according to the encoding module 6000 shown in FIG. 23, and the decoding module may implement decoding according to the decoding module 7000 shown in FIG. 24. For a specific implementation process, refer to specific introduction of a corresponding embodiment. Details are not described herein again. In this way, a terminal device can encode a picture file of a source format such as jpeg, png, or gif, so as to form a picture file of a new format. In this way, encoding performed by using the video encoding modes can improve a compression ratio of the picture file, and additionally the RGB data and the transparency data in the picture file are respectively encoded, to reserve the transparency data in the picture file while using the video encoding modes. The picture file of the new format may be further decoded to obtain corresponding RGBA data, so as to implement decoding by using the video encoding/decoding mode to obtain the RGB data and the transparency data, and ensure quality of the picture file.

A person of ordinary skill in the art may understand that all or some of the procedures of the methods of the foregoing embodiments may be implemented by a computer program code, which them executed by one or more processors, performs the steps of the methods of the embodiments discussed above. Moreover, the program code may include individual computer program code for each of the steps discussed above. For example, with reference to FIG. 1, the computer program code may include obtaining code that is configured to cause at least one processor to obtain RGBA data corresponding to a first image in a picture file as discussed above in step 101, and the computer program code may include encoding code that is configured to cause at least one processor to encode the RGB data of the first image according to a first video encoding mode, to generate first stream data as discussed above in step 102, and so on, for each of the operations/steps shown in the figures. The program code may be stored in a computer readable storage medium. When the program code is executed by at least one processor, the at least one processor may perform the procedures of the embodiments of the foregoing methods. The storage medium may be a magnetic disk, an optical disc, read-only memory (ROM), a random access memory (RAM) or the like.

What is disclosed above is merely an example of the embodiments of this application, and certainly is not intended to limit the protection scope of the embodiments. Therefore, equivalent variations made in accordance with the claims of the present disclosure shall fall within the scope of this application.

What is claimed is:

1. A method executed by at least one processor, the method comprising:
 parsing a picture file, to obtain a picture header information data segment, first stream data, and second stream data of a first image thereof, the picture header information data segment including image feature information including an alpha channel flag that indicates whether the picture file includes alpha channel data;

based on the alpha channel flag indicating the picture file includes alpha channel data, parsing the picture file to obtain an image frame header information data segment and a transparent channel frame header information data segment;

decoding the first stream data of the first image according to information included in the image frame header information data segment using a first video decoding mode, to generate red-green-blue (RGB) data of the first image;

decoding the second stream data of the first image according to information included in the transparent channel frame header information data segment using a second video decoding mode, to generate Alpha data of the first image; and generating red-green-blue-alpha (RGBA) data corresponding to the first image according to the RGB data and the Alpha data of the first image, wherein the first video decoding mode comprises at least an I-frame decoding mode, and the second video decoding mode comprises the I-frame decoding mode and/or a P-frame decoding mode.

2. The method according to claim 1, wherein the decoding the first stream data comprises:

decoding the first stream data to generate first brightness and chrominance (YUV) data of the first image, wherein the first YUV data is first color encoding data generated according to the RGB data of the first image; and converting the first YUV data into the RGB data of the first image.

3. The method according to claim 1, wherein the decoding the second stream data comprises:

decoding the second stream data to generate second YUV data of the first image, wherein the second YUV data is second color encoding data generated according to transparency data of the first image; and converting the second YUV data into the Alpha data of the first image.

4. The method according to claim 3, wherein the converting the second YUV data comprises:

setting a Y component in the second YUV data to the Alpha data of the first image, and discarding UV components in the second YUV data; or setting the Alpha data of the first image to the Y component in the second YUV data, and setting UV components in the second YUV data to be preset data.

5. The method according to claim 1, further comprising:

updating a value of k in response to the picture file being a picture file in a dynamic format and the first image being an image corresponding to a kth frame in the picture file of the dynamic format, to obtain, from a stream data segment of the picture file, third stream data and fourth stream data that are generated from a second image corresponding to an updated kth frame in the picture file;

decoding the third stream data to generate RGB data of the second image;

decoding the fourth stream data to generate Alpha data of the second image; and generating RGBA data corresponding to the second image according to the RGB data and the Alpha data of the second image.

6. The method according to claim 5, wherein the updating the value of k comprises adding 1 to the value of k, and wherein after the generating RGBA data corresponding to the second image according to the RGB data and the Alpha data of the second image, the method further comprises:

determining whether the image that corresponds to the current kth frame is a last frame in the picture file of the dynamic format, and in response to determining that the first image is the last frame, completing decoding on the picture file of the dynamic format, and in response to determining that the image is not the last frame, updating the value of k again, wherein k is a positive integer greater than or equal to 1.

7. The method according to claim 1, wherein the picture header information data segment further comprises image sequence header data, image supplement data and image user data, wherein the image sequence header data is configured to identify the picture file, the image supplement data is configured to describe exchangeable image file format (EXIF) information of the picture file, and the image user data comprises information of an image user data start code and a user data length.

8. The method according to claim 7, wherein the image sequence header data comprises an image identifier, a codec ID, and a version ID;

the image identifier indicates a type of the picture file, and the codec ID indicates an identifier of a decoding standard decoding the picture file; and the version ID indicates a profile of the decoding standard.

9. The method according to claim 1, wherein the image feature information further comprises an image feature start code, an image feature data length, a dynamic picture flag, a value of YUV format, a lossless flag, a YUV limit range flag, an information of reserved bits, a width of the picture file, a height of the picture file.

10. The method according to claim 1, wherein the image frame header information data segment indicates one of the image feature information of each image of the picture file, and the image frame header information data segment comprises an image frame start code, an information of image frame stream length, and delay time information related to the picture file when the picture file is in a dynamic format; and the transparent channel frame header information data segment indicates another image feature information in the second stream data, and the transparent channel frame header information data segment comprises an alpha channel start code, and information of an alpha frame stream length, wherein the second stream data of the first image is decoded based on the alpha channel start code and the alpha frame stream length to generate Alpha data of the first image.

11. An apparatus comprising:

at least one memory configured to store computer program code; and at least one processor configured to access the at least one memory and operate according to the computer program code, the computer program code comprising:

first obtaining code configured to cause at least one of the at least one processor to obtain a picture header information data segment, first stream data, and second stream data of a first image by parsing a picture file, the picture header information data segment including image feature information including an alpha channel flag that indicates whether the picture file includes alpha channel data;

second obtaining code configured to cause at least one of the at least one processor to, based on the alpha channel flag indicating the picture file includes alpha channel data, obtain an image frame header information data segment and a transparent channel frame header information data segment by parsing the picture file;

first decoding code configured to cause at least one of the at least one processor to decode the first stream data of the first image according to information included in the image frame header information data segment using a first video decoding mode, to generate red-green-blue (RGB) data of the first image;

second decoding code configured to cause at least one of the at least one processor to decode the second stream data of the first image according to information included in the transparent channel frame header information data segment using a second video decoding mode, to generate Alpha data of the first image; and first generation code configured to cause at least one of the at least one processor to generate red-green-blue-alpha (RGBA) data corresponding to the first image according to the RGB data and the Alpha data of the first image, wherein the first video decoding mode comprises at least an I-frame decoding mode, and the second video decoding mode comprises the I-frame decoding mode and/or a P-frame decoding mode.

12. The apparatus according to claim 11, wherein the first decoding code comprises:

YUV data decoding code configured to cause at least one of the at least one processor to decode the first stream data to generate first YUV data of the first image, wherein the first YUV data is first color encoding data generated according to the RGB data of the first image; and converting code configured to cause at least one of the at least one processor to convert the first YUV data into the RGB data of the first image.

13. The apparatus according to claim 11, wherein the second encoding code further comprises:

YUV data decoding code configured to cause at least one of the at least one processor to decode the second stream data to generate second YUV data of the first image, wherein the second YUV data is second color encoding data generated according to transparency data of the first image; and converting code configured to cause at least one of the at least one processor to convert the second YUV data into the Alpha data of the first image.

14. The apparatus according to claim 13, wherein the converting code comprises:

first setting code configured to cause at least one of the at least one processor to set a Y component in the second YUV data to the Alpha data of the first image, and discarding UV components in the second YUV data; or second setting code configured to cause at least one of the at least one processor to set the Alpha data of the first image to the Y component in the second YUV data, and setting UV components in the second YUV data to be preset data.

15. The apparatus according to claim 11, wherein the computer program code further comprises:

updating code configured to cause at least one of the at least one processor to update a value of k, in response to the picture file being a picture file in a dynamic format and the first image being an image corresponding to a kth frame in the picture file of the dynamic format, to obtain, from a stream data segment of the picture file, third stream data and fourth stream data that are generated from a second image corresponding to an updated kth frame in the picture file;

third decoding code configured to cause at least one of the at least one processor to decode the third stream data to generate RGB data of the second image;

fourth decoding code configured to cause at least one of the at least one processor to decode the fourth stream data to generate Alpha data of the second image; and first generation code configured to cause at least one of the at least one processor to generate RGBA data corresponding to the second image according to the RGB data and the Alpha data of the second image.

16. The apparatus according to claim 15, wherein the updating code comprises adding code configured to cause at least one of the at least one processor to add 1 to the value of k, and wherein the computer program code further comprises:

determining code configured to cause at least one of the at least one processor to, after the generating RGBA data corresponding to the second image according to the RGB data and the Alpha data of the second image, determine whether the image that corresponds to the current kth frame is a last frame in the picture file of the dynamic format, and in response to determining that the first image is the last frame, complete decoding on the picture file of the dynamic format, and in response to determining that the first image is not the last frame, update the value of k again, wherein k is a positive integer greater than or equal to 1.

17. The apparatus according to claim 11, wherein the picture header information data segment further comprises image sequence header data, image supplement data and image user data, wherein the image sequence header data is configured to identify the picture file, the image supplement data is configured to describe exchangeable image file format (EXIF) information of the picture file, and the image user data comprises information of an image user data start code and a user data length.

18. The apparatus according to claim 17, wherein the image sequence header data comprises an image identifier, a codec ID, and a version ID, the image identifier indicates a type of the picture file,
the codec ID indicates an identifier of a decoding standard decoding the picture file, and
the version ID indicates a profile of the decoding standard.

19. The apparatus according to claim 11, wherein the image feature information further comprises an image feature start code, an image feature data length, a dynamic picture flag, a value of YUV format, a lossless flag, a YUV limit range flag, an information of reserved bits, a width of the picture file, a height of the picture file.

20. A non-transitory computer readable storage medium storing computer program code which, when executed by at least one processor, causes the at least one processor to:

parse a picture file, to obtain a picture header information data segment, first stream data, and second stream data of a first image thereof, the picture header information data segment including image feature information including an alpha channel flag that indicates whether the picture file includes alpha channel data;

based on the alpha channel flag indicating the picture file includes alpha channel data, parse the picture file to obtain an image frame header information data segment and a transparent channel frame header information data segment;

decode the first stream data of the first image according to information included in the image frame header information data segment using a first video decoding mode, to generate red-green-blue (RGB) data of the first image;

decode the second stream data of the first image according to information included in the transparent channel frame header information data segment using a second video decoding mode, to generate Alpha data of the first image; and generate red-green-blue-alpha (RGBA) data corresponding to the first image according to the RGB data and the Alpha data of the first image, wherein the first video decoding mode comprises at least an I-frame decoding mode, and the second video decoding mode comprises the I-frame decoding mode and/or a P-frame decoding mode.

* * * * *